United States Patent [19]
Hsu et al.

[11] Patent Number: 5,991,464
[45] Date of Patent: Nov. 23, 1999

[54] METHOD AND SYSTEM FOR ADAPTIVE VIDEO IMAGE RESOLUTION ENHANCEMENT

[75] Inventors: Pohsiang Hsu, Beltsville; Kuo Juey Ray Liu, Silver Spring, both of Md.

[73] Assignee: Odyssey Technologies, Jessup, Md.

[21] Appl. No.: 09/054,385

[22] Filed: Apr. 3, 1998

[51] Int. Cl.[6] .................................................. G06K 9/32
[52] U.S. Cl. .......................... 382/300; 382/298; 348/448; 348/458; 358/428; 358/525
[58] Field of Search .................... 382/266–276, 382/298–300, 261–264, 278; 345/127–130, 137, 141, 150, 439; 358/428, 444, 447, 451, 525; 348/448, 452, 458, 625, 441, 222, 581–583; 364/723, 724.1, 724.011

[56] References Cited

U.S. PATENT DOCUMENTS

| | | | |
|---|---|---|---|
| 4,532,602 | 7/1985 | DuVall | 345/150 |
| 4,833,531 | 5/1989 | Abe et al. | 382/300 |
| 4,853,794 | 8/1989 | Fukumoto et al. | 358/447 |
| 5,054,100 | 10/1991 | Tai | 382/300 |
| 5,125,042 | 6/1992 | Kerr et al. | 382/300 |
| 5,131,057 | 7/1992 | Walowit et al. | 382/264 |
| 5,294,998 | 3/1994 | Piovoso et al. | 358/428 |
| 5,301,266 | 4/1994 | Kimura | 345/439 |
| 5,329,614 | 7/1994 | Kidd et al. | 345/439 |
| 5,384,904 | 1/1995 | Sprague et al. | 345/439 |
| 5,388,166 | 2/1995 | Onozawa | 382/269 |
| 5,418,714 | 5/1995 | Sarver | 600/407 |
| 5,418,899 | 5/1995 | Aoki et al. | 345/439 |
| 5,418,900 | 5/1995 | Yoshinaga | 345/439 |
| 5,444,493 | 8/1995 | Boif | 348/448 |
| 5,450,096 | 9/1995 | Yoshida et al. | 345/141 |
| 5,473,383 | 12/1995 | Sezan et al. | 348/452 |
| 5,513,281 | 4/1996 | Yamashita et al. | 382/278 |
| 5,515,457 | 5/1996 | Osano | 382/300 |
| 5,552,825 | 9/1996 | Talluri et al. | 348/222 |
| 5,579,418 | 11/1996 | Williams et al. | 382/300 |
| 5,627,953 | 5/1997 | Yen | 345/439 |
| 5,742,348 | 4/1998 | Kuwahara et al. | 348/441 |
| 5,774,601 | 6/1998 | Mahmoodi | 382/298 |

OTHER PUBLICATIONS

Y. Wang, et al., "Image Representation Using Block Pattern Models and Its Image Processing Applications," *IEEE Transactions on Pattern Analysis and Machine Intelligence*, vol. 15, No. 4, Apr. 1993, pp. 321–336.

*Primary Examiner*—Leo H. Boudreau
*Assistant Examiner*—Ishrat Sherali
*Attorney, Agent, or Firm*—Rosenberg, Klein & Bilker

[57] ABSTRACT

A system (1) for enhancing the resolution of a video image by a predetermined enhancement factor is provided. System (1) generally includes an interpolation subsystem (10), a data storage module (20), and a pixel insert positioning module (30). Included within interpolation subsystem (10) are a classification module (100), a bilinear interpolation module (200), and an adaptive interpolation module (300). Classification module (100) receives the original image pixels in a specified field of the given video image and designates for each original image pixels it receives one of a plurality of predefined classifications. Based upon this classification, one of the bilinear interpolation (200) and adaptive interpolation (300) modules is selected for actuation in generating the supplementary image pixels necessary to support resolution enhancement. Adaptive interpolation module (300) employs an interpolation scheme adapted for the orientation of a given image portion detected by classification module (100) through a plurality of adaptation parameters which, once generated, may be stored within data storage module (20) to promote computational efficiency. The generated supplementary image pixels may then be inserted at the pixel insert positions generated by pixel insert positioning module (30) in accordance with the given enhancement factor to form a resolution enhanced image.

29 Claims, 10 Drawing Sheets

METHOD AND SYSTEM FOR ADAPTIVE VIDEO IMAGE RESOLUTION ENHANCEMENT

BACKGROUND OF THE INVENTION

1. Field of the Invention

The subject adaptive video image resolution enhancement system (and the method incorporated thereby) is generally directed to a system for generating the additional image pixels necessary for increasing the resolution of the video image initially represented by a plurality of original image pixels. More specifically, the subject adaptive video image resolution enhancement system generates and assigns for insert at the proper locations adjacent the original image pixels a plurality of supplementary image pixel intensity levels. The subject system accomplishes this in a manner that optimally preserves image fidelity so that the detrimental effects typically accompanying image resolution enhancement, such as the introduction of abrupt discontinuities in otherwise smooth image edges, are significantly diminished.

The need for resolution enhancement of an image defined by a set of image pixels is present in many video applications. For instance, where an original image is expanded in size, either to simply zoom into a portion thereof, or to re-display it on a display monitor having a larger or denser array of available image pixels, the expanded image would invariably be characterized by discontinuous, jagged edges and a general degeneration of discernible details if a corresponding enhancement in its image pixel resolution is not also performed. Similarly, where a video image is to be electronically transmitted to remote site to support, for example, a video conferencing application, the goal towards instantaneous exchange of video information between conferencing sites demands that the volume of data transmitted be minimized as much as possible. Consequently, the video reproduced at the receiving site often lacks the image data content to yield high fidelity images. There is, therefore, a need exemplified in such applications for a system capable of generating additional pixel data with which to supplement some or all of the pixels of an original image in a manner which preserves much, if not all, of the fidelity present in the original image.

Simply adding additional image pixels in reproducing an original video image, or a portion thereof, does not necessarily meet this need. The additional image pixels must be carefully generated. One must consider in this regard that the features of a given video image which most perceptively affect its overall image fidelity are the numerous image edge portions by which that image is typically defined. Whether they be ones tracing the peripheral outlines of an image or ones tracing particular features within the body of the image, edges are highly discernible and therefore disproportionately important to the average viewer in visually discriminating the image. Thus, it is essential for the preservation of image fidelity that the smoothness and sharpness of edges be effectively preserved.

2. Prior Art

Video image resolution enhancement systems and image size expansion systems are known in the art. The best prior art known to Applicant includes U.S. Pat. Nos. 4,853,794; 5,418,899; 5,473,383; 5,054,100; 5,131,057; 5,515,457; 5,513,281; 5,125,042; 4,532,602; 5,444,493; 5,579,418; 4,833,531; 5,294,998; 5,301,266; 5,329,614; 5,450,096; 5,418,900; 5,627,953; 5,388,166; 5,418,714; and, 5,384,904. This prior art reveals that it is known in the prior art to perform various types of interpolation such as nearest neighbor, bilinear, and cubic convolution. The prior art also discloses systems or methods which perform edge detection for adjusting the interpolation process to incorporate such measures as compensation for blurring that might otherwise occur. The prior art, however, fails to disclose a system or method which provides the degree of adaptivity provided by the present invention, much less a system or method which effects such adaptivity by alternatively performing a bilinear interpolation scheme and an adaptive interpolation scheme responsive to a classification process as provided by the present invention.

Systems and methods known in the prior art which seek to offer image resolution enhancement with a level of adaptivity sufficient to measurably compensate for the detrimental effects on image fidelity of processes such as image scale expansion invariably fail to yield the combined degree of effectiveness and computational efficiency to be practicable. Consequently, the resolution enhancement systems most widely utilized in the prior art have been those systems which simply employ one known form of interpolation, such as bilinear interpolation, wherever possible in the entire field of a given image. While, in most cases, bilinear interpolation is acceptable for low-contrast, internal body portions of an image, it is not acceptable for more discernibly contrasted portions such as an image's edge portions. High image fidelity cannot be consistently preserved without additional measures.

SUMMARY OF THE INVENTION

A primary object of the present invention is to provide a system for adaptively enhancing the resolution of a video image in a manner that preserves much, if not all, of the original video image fidelity.

It is another object of the present invention to provide a system for adaptively enhancing the resolution of a video image wherein a plurality of supplementary image pixels are generated by use of one of a plurality of adaptively selected interpolation schemes.

It is yet another object of the present invention to provide a system for enhancing the resolution of a video image in a simple, computationally-efficient manner.

It is yet another object of the present invention to provide a system for enhancing the resolution of a video image which facilitates quick and efficient image expansion by either a factor of 2 or by an arbitrary expansion factor.

It is still another object of the present invention to provide a system for enhancing the resolution of a video image wherein an adaptive interpolation scheme is employed to generate a given set of supplemental image pixels when a given portion of the video image is classified to include an edge feature having a dominant orientation angle.

These and other objects are attained in the subject system for adaptively enhancing by a predetermined enhancement factor the resolution of a video image characterized by a plurality of original image pixels having predetermined intensities. The system generally includes a data storage module for storing video image information such as predetermined intensities of the original image pixels and a plurality of predetermined parametric coefficient sets. The system also includes a classification module coupled to the data storage module for reading at least a portion of the video image information and generating for selected original image pixels responsive to that video image information one of a plurality of predefined image classifications including, in particular embodiments, an oriented classification and a non-oriented classification. The classification module generates for each original image pixel having an oriented classification a dominant orientation parameter. The system further includes a pixel insert positioning module coupled to the data storage module for generating, in accordance with the enhancement factor selected, at least one pixel insert position relative to each of the selected original image pixels. The system, moreover, includes an adaptive interpolation module coupled to the classification module, the pixel insert positioning module, and the data storage module for generating a supplementary image pixel for each pixel insert position corresponding to each of the selected original image pixels having an oriented classification. The adaptive interpolation module reads the dominant orientation parameter and selects one of a predetermined parametric coefficient sets responsive thereto and generates each supplementary image pixel as a function of a plurality of adaptation parameters that include the pixel insert position, the dominant orientation parameter, and the predetermined set of parametric coefficients selected.

Stated in different terms, the method incorporated by the subject system for adaptively enhancing the resolution of a video image characterized by a plurality of original image pixels generally includes the step of establishing a primary image field containing at least a portion of the given video image's original image pixels. The method also includes the step of iteratively designating each of the original image pixels in the primary image field as a reference image pixel, then defining for each reference image pixel a neighborhood containing a plurality of original image pixels. The method includes the further step of designating for each reference image pixel, responsive to at least a portion of the predetermined original pixel's intensities in the neighborhood thereof, one of a plurality of predefined image classifications, and selecting for each reference image pixel, responsive to that image classification designation, one of a plurality of predefined interpolation schemes for generating at least one supplemental image pixel. The predefined interpolation schemes include an adaptive interpolation scheme for generating a supplemental image pixel as a function of a plurality of adaptation parameters which include a dominant orientation parameter and a set of parametric coefficients. The dominant orientation parameter is determined responsive to at least a portion of the predetermined original image pixel intensities in the given neighborhood. By use of the selected interpolation scheme, a plurality of supplemental image pixels are generated for insert into preselected pixel insert positions in forming a resolution enhanced video image.

DETAILED DESCRIPTION OF THE PREFERRED EMBODIMENTS

Figure 1:
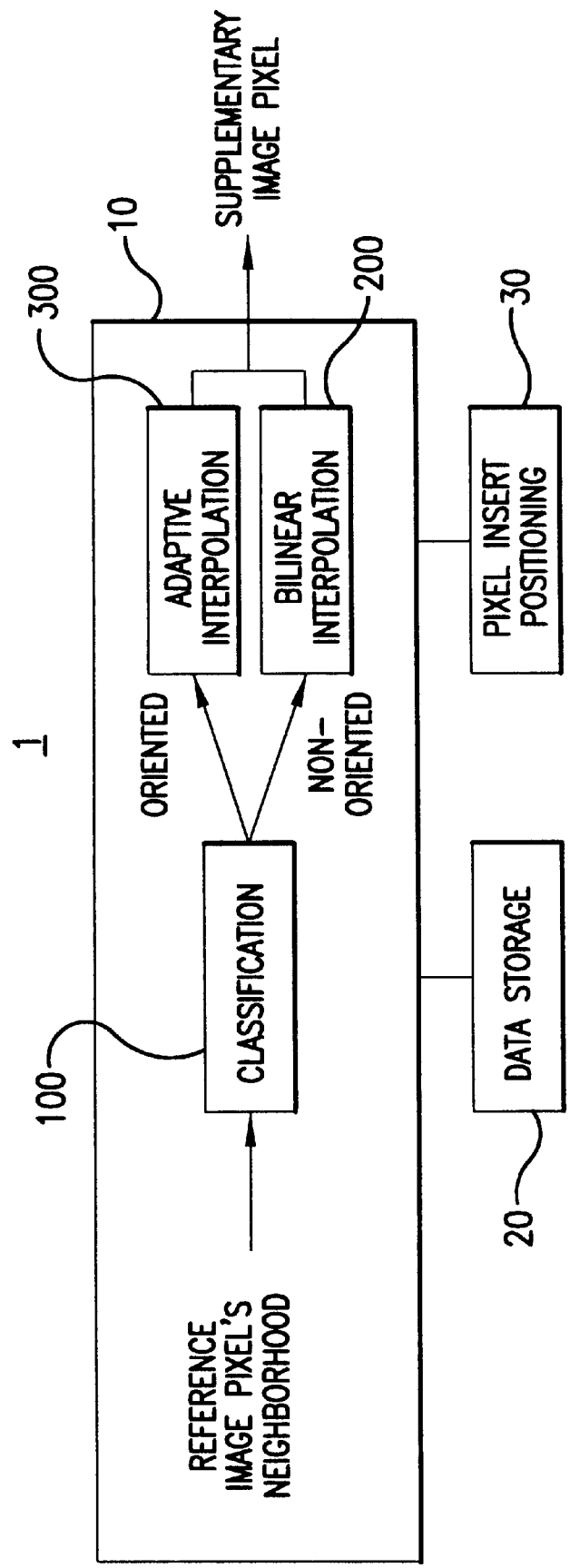
FIG. 1 is a schematic block diagram of a preferred embodiment of the present invention.

Turning now to FIG. 1, there is shown a schematic block diagram generally illustrating an embodiment of the present invention. As shown, the subject adaptive video image resolution enhancement system 1 generally includes an interpolation sub-system 10, a data storage module 20, and a pixel insert positioning module 30. In accordance with the present invention, interpolation sub-system 10 communicates with data storage module 20 and pixel insert positioning module 30 to generate intensity information for supplementary image pixels to be inserted amongst, and in some cases, in place of, the original image pixels of a video image to form a reproduced video image of finer resolution.

Important aspects of the present invention are found in the configuration of interpolation sub-system 10 described in following paragraphs. The particular configuration of either data storage module 20 or pixel insert positioning module 30 is not important to the present invention. It is preferable, though, that data storage module 20 include a suitable memory device of a type known in the art characterized by high access speed. Pixel insert positioning module 30 may include any logic or other circuitry known in the art so long as it is operably sufficient to generate, for a pre-selected resolution enhancement factor, the proper pixel insert positions at which the supplementary image pixels generated by the subject adaptive resolution enhancement system 1 may be inserted within a display monitor's (not shown) pixel array in forming a resolution-enhanced image.

Utilization of resolution enhancement system 1 enables the realization of an expanded scale reproduction of a video image with a level of image fidelity heretofore unseen in prior art attempts at such reproduction. To that end, system 1 employs within interpolation sub-system 10 a classification module 100 which examines the original image pixels in a designated field of the given video image to designate therefor either an 'oriented' classification or 'non-oriented' classification. Classification module 100 preferably does so by iteratively considering each original image pixel in the image field of interest as a reference image pixel and examining the image information in predefined pixel locations surrounding and including the location of the reference image pixel as it is designated as such. The set of original image pixels at these predefined pixel locations surrounding and including the reference image pixel location is defined for the purposes of analysis as the reference image pixel's neighborhood.

Interpolation sub-system 10 also includes a bilinear interpolation module 200 and an adaptive interpolation module 300, one of which is selected for processing image data responsive to the classification performed in classification module 100. Where classification module 100 designates for a reference image pixel a non-oriented classification, bilinear interpolation module 200 is selected in favor of adaptive interpolation module 300 for generation of the intensities to be assigned to that reference image pixel's supplementary image pixels. Where classification module 100 designates for the reference image pixel an oriented classification, adaptive interpolation module 300 is selected.

In performing the classification, classification module 100 analyzes a reference image pixel's neighborhood as to whether or not it indicates an oriented portion or a non-oriented portion of the video image. That is, module 100 determines for the given reference image pixel whether or not the portion of the video image represented by the reference image pixel's neighborhood contains a sufficiently discernible directional pattern typical of such features as image-defining edges. Upon a determination in the affirmative, classification module 100 applies the oriented classification to the reference image pixel. Conversely, upon determination in the negative, classification module 100 applies a non-oriented classification to that reference image pixel.

The subject adaptive resolution enhancement system 1 may find application in a video image display system of any type known in the art. In a video display system of one particular type known in the art, the pixels forming a color image are each defined by a 24-bit YUV image data words. 8-bits of each word represents luminance channel data, while the remaining two 8-bit portions represent chrominance channel data. While the present invention is not limited in application only to luminance channel data, it is preferable that the adaptive resolution enhancement performed in accordance with the present invention be performed only on luminance channel data, with simple bilinear interpolation being performed on chrominance channel data. The subject adaptive resolution enhancement system 1 is described in following paragraphs in terms of this exemplary application.

As indicated in FIG. 1, interpolation subsystem 10 both reads from and writes into data storage module 20 information pertaining to the video image, including image pixel information and various parameters corresponding thereto. Interpolation subsystem 10 receives from pixel insert positioning module 30 the pixel insert positions corresponding to the supplementary image pixels to be generated. As will be described in following paragraphs, pixel insert positioning module 30 generates the pixel insert positions for each supplementary image pixel, preferably in terms of (x,y) offset coordinates within a Cartesian coordinate reference system centered at the given reference image pixel.

Figure 2:
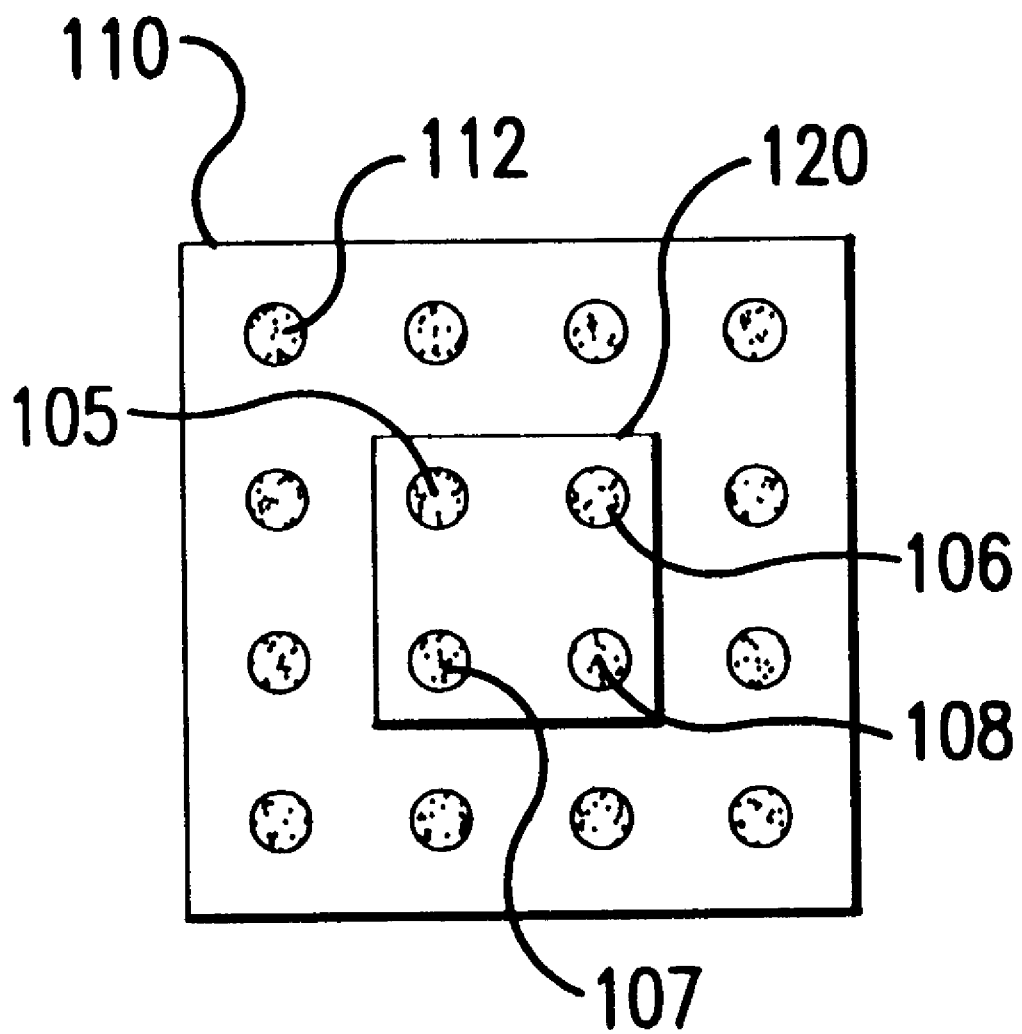
FIG. 2 is an illustrative diagram depicting the neighborhood and block of a reference image pixel, as defined in a preferred embodiment of the present invention.

Referring to FIG. 2, there is shown an illustration of the neighborhood 110 as it is preferably defined about a reference image pixel 105. Neighborhood 110 encompasses a block 120 preferably defined as the four original image pixels containing the reference image pixel and the three adjacent original image pixels 106, 107, 108 positioned relative to reference image pixel 105 respectively at offset coordinate reference points (1,0), (0,-1), and (1,-1) (in a Cartesian coordinate reference system centered at reference image pixel 105). Neighborhood 110 also includes the twelve original image pixels 112 immediately surrounding block 120 such that it preferably includes sixteen total original image pixels including and surrounding reference image pixel 105.

It should be recognized that the present invention is not limited to any particular definition of neighborhood 110, nor to any particular number of original image pixels contained therein. It was found from repeated testing, however, that the definition of neighborhood 110 as shown in FIG. 2 yields optimal results for wide ranges of resolution enhancement scale factors and video image complexities.

Figure 3:
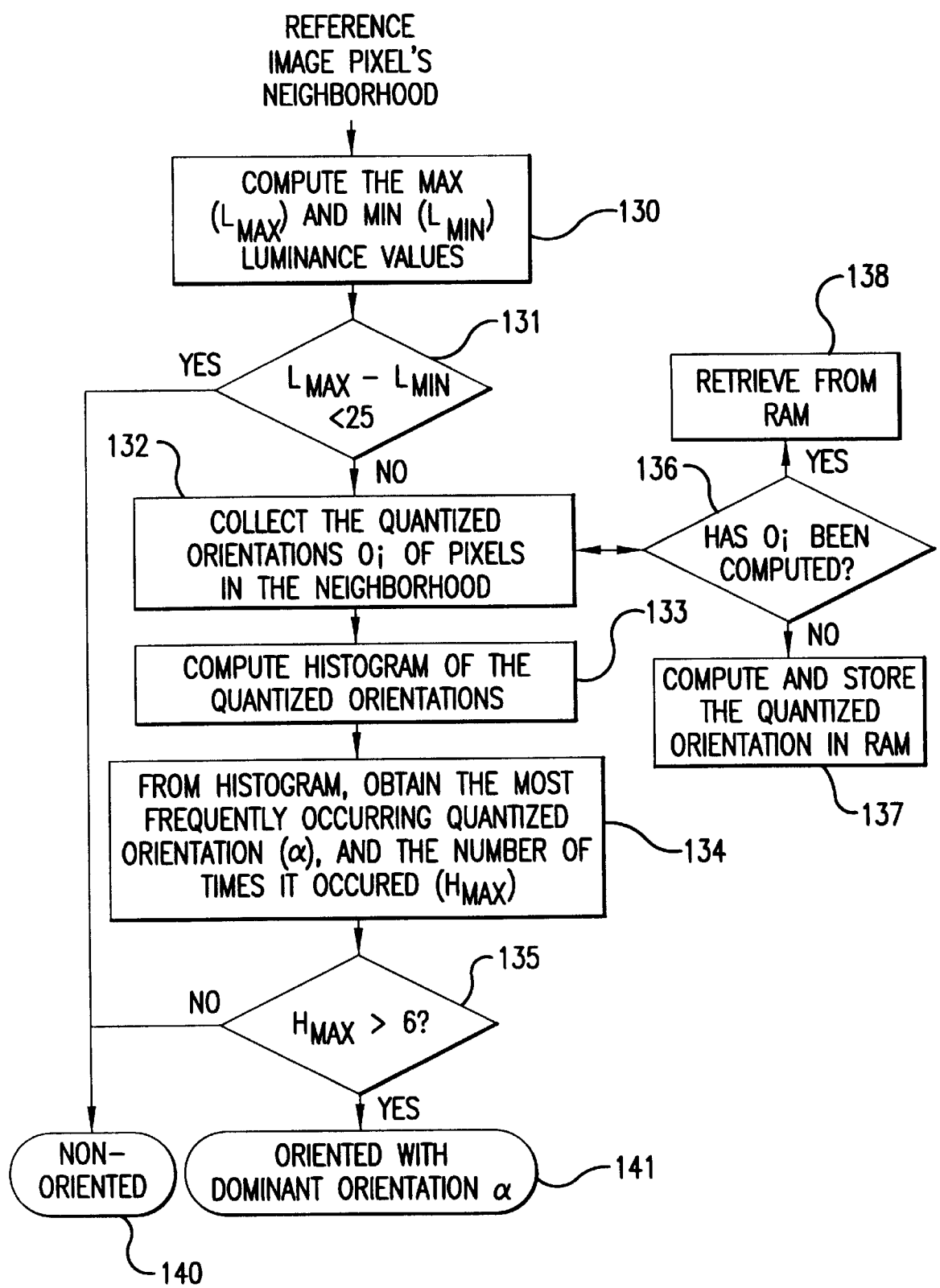
FIG. 3 is a functional flow diagram illustrating the operation of a classification module in a preferred embodiment of the present invention.

Turning to FIG. 3, there is shown a flow diagram illustrating the functional steps by which classification module 100 performs the necessary classification for a given original image pixel. The functional steps shown are performed for a reference image pixel, iteratively setting each of the original image pixels about which a valid neighborhood of surrounding pixels may be formed as the reference image pixel. For those original image pixels about which a valid neighborhood cannot be formed, such as those forming an image boundary portion, or those physically located sufficiently near the perimeter of the given display monitor's image pixel array; bilinear interpolation is simply performed—that is, if a block of surrounding pixels may be formed thereabout. For those original image pixels without the surrounding image pixels necessary to form a block thereabout, for instance, those along the bottom and right perimeters of the image pixel array; a suitable nearest neighbor interpolation is performed. The nearest neighbor interpolation scheme is well known in the art and, therefore, not described in greater detail here. Similarly, any suitable means known in the art may be employed to identify those original image pixels about which a valid neighborhood or block cannot be formed; hence, it is not further described in greater detail.

As shown in the flow diagram, the neighborhood of the current reference image pixel is examined in block 130 to determine the maximum and minimum luminance values found in the sixteen original image pixels thereof. The difference between these maximum and minimum luminance values is computed to determine whether or not the neighborhood embodies sufficient visual contrast to potentially be one which represents a discernible image edge portion. The computed difference, or luminance variation, parameter is compared to a variation threshold level which is preferably pre-set to the integer value 25, as indicated in block 131. Where the luminance variation parameter fails to exceed the variation threshold level, the reference image pixel is summarily classified to be non-oriented in block 140, and the classification process for that reference image pixel is concluded; the classification process then proceeding for the next reference image pixel, if any. Where the luminance variation parameter does exceed the variation threshold level, a further test is performed to determine if the original image pixels of the given reference image pixel's neighborhood are those which do indeed form a substantially delineated edge portion of the image.

A factor indicative of such delineation of an image edge portion is the existence of a sufficiently consistent, or dominant, angular orientation of measurably correlated image pixel luminance values about the original image pixels of the neighborhood. The test, therefore, comprises the computation in step 132 of a quantized orientation parameter for each original image pixel in the neighborhood, followed by identification of the quantized orientation parameter value, if any, which occurs with sufficient consistency to dominate.

As a first step in the test, an orientation angle is computed for each neighborhood original image pixel as a function of the luminance values in nearby original image pixels belonging to an X-dimensional reference set and to a Y-dimensional reference set. The X-dimensional reference set is defined to include those original image pixels located relative to the given neighborhood original image pixel's position at offset coordinate reference points (1,1), (0,1), (−1,1), (1,−1), (0,−1), and (−1,−1). The Y-dimensional reference set is defined to include those original image pixels located relative to the given neighborhood original image pixel's position at offset X-Y coordinate reference points (1,1), (1,0), (1,−1), (−1,1), (−1,0), and (−1,−1). Each orientation angle is then determined in accordance with the following equations:

$$Qx = Pq_1 + 2(Pq_2) + Pq_3 - Pq - 2(Pq_5) - Pq_6$$

$$Qy = Pq_1 + 2(Pq_7) + Pq_4 - Pq_3 - 2(Pq_8) - Pq_6$$

$$A = [-57.2958 \ (\text{Tan}^{-1} \ Qx/Qy)]_{MOD \ 180}$$

Wherein, $Pq_1$, $Pq_2$, $Pq_3$, $Pq_4$, $Pq_5$, $Pq_6$, $Pq_7$ and $Pq_8$ respectively denote the luminance values of the original image pixels contained in either or both of the X- and Y-dimensional reference sets—those located at offset x, y coordinate reference points (1,1), (0,1), (−1,1), (1,−1), (−1,−1), (1,0), and (−1,0) relative to the position of the given neighborhood original image pixel; and, A denotes the orientation angle therefor.

Note that the orientation angle, A, is necessarily determined to be an angle between −11.25° and 168.75°. Any angle less than −11.25° or greater than 168.75° may obviously be replaced by an equivalent angle falling between these limits.

The test for dominant orientation in the neighborhood proceeds by quantizing each orientation angle A with reference to a plurality of quantization sectors into which the 180° angular range bounded by −11.25° and 168.75° is divided. This range is divided into eight quantization sectors, each sector having an approximate radial width of 22.5° and being characterized by a unique sector angle. Preferably, sector angle values of 0.0°, 22.5°, 45.0°, 67.5°, 90.0°, 112.5°, 135.0°, and 157.5° are respectively assigned to the eight quantization sectors.

Upon computation of each orientation angle A for an original image pixel in the given neighborhood, the sector angle of the quantization sector into which the orientation angle A falls is assigned as the quantized orientation parameter of that neighborhood original image pixel. A histogram of the quantized orientation parameters for the neighborhood is then formed at step 133. Recurrence counts of each of the quantized orientation parameter values occurring in the neighborhood are thereby made; and, the recurrence count of the most highly recurrent quantized orientation parameter value is determined at step 134. At step 135, the maximum recurrence count $R_{MAX}$ determined in the preceding step is compared with a recurrence count threshold level which is preferably set to the integer value 6.

If the maximum recurrence count $R_{MAX}$ fails to exceed the recurrence count threshold level, the portion of the video image formed by the given neighborhood is likely too textured to represent an image edge portion. The current reference image pixel in that case is classified non-oriented at step 140. If, on the other hand, the maximum recurrence count $R_{MAX}$ does exceed the recurrence count threshold level, the portion of the image formed by the given neighborhood likely represents an image edge portion. Accordingly, the current reference image pixel in that case is classified oriented at step 141, and the most highly recurrent quantized orientation parameter is assigned as the dominant orientation parameter α for the given reference image pixel.

Proximate original image pixels will share in their respective neighborhoods certain original image pixels by which they are mutually surrounded. As the above-described dominant orientation test is performed with each original image pixel in the image field of concern having been taken as the reference image pixel, redundant computations of quantized orientation parameters may occur if proper avoidance measures are not employed. One such avoidance measure, shown at step 136, is to perform prior to computation of an original image pixel's quantized orientation parameter a check to determine if such computation has already been performed. If it has, the already-computed quantized orientation parameter may simply be retrieved from a random access memory (RAM) device within data storage module 20, as indicated at step 138. If it has not, computation may be performed at step 137 as described, and the computed quantized orientation parameter for that original image pixel may be added to the data within the appropriate RAM device of data storage module 20 (FIG. 1) available for subsequent access.

To facilitate this process, a quantized orientation table is preferably maintained in the RAM device within data storage module 20. The table is organized as a two-dimensional array whose discrete entries correspond directly to the discrete original image pixels in the given display monitor's image pixel array. The table's entries are each initialized with a flag set to indicate that no quantized orientation parameter has been computed for its corresponding original image pixel. As the classification process progresses, the flags are individually replaced with the quantized orientation parameter values that are generated.

Referring back to FIG. 1, based upon the output of classification module 100, an interpolation scheme to be employed for generating the supplementary image pixels necessary for resolution enhancement is selected by switching either to bilinear interpolation module 200 or adaptive interpolation module 300. Prior to performing interpolation in either module 200, 300, however, the pixel insert positions (Xs, Ys) of the supplementary image pixels to be generated must first be determined by pixel insert positioning module 30 relative to the position of the current reference image pixel. It is instructive to note in this regard that the location of such pixel insert positions on the given display monitor will naturally depend on the resolution enhancement factor value selected. In the simplest case wherein the value selected is a numeric factor of 2, the appropriate pixel insert positions may be conveniently determined by proportional spacing between the reference image pixel and each of the original image pixels in its block. This holds true since the position of each original image pixel corresponds to a pixel position in the resolution enhanced image being formed, and each original image pixel thus serves as an image pixel in the resolution enhanced image.

In the more cumbersome general case wherein the value of the resolution enhancement factor is chosen to an arbitrary value other than a factor of 2, accurate location of the pixel insert positions can only be ascertained once the size of the image pixel array on which the resolution enhanced image will actually be displayed is known. It cannot be ascertained in relative terms, as it can in the 'factor of 2' case, simply by proportionally spacing between immediately adjacent original image pixel locations. The pixel insert positioning module 30 must first determine the proper locations of the pixel insert positions within the given display monitor's image pixel array, based on the value of the enhancement factor chosen.

Figure 4:
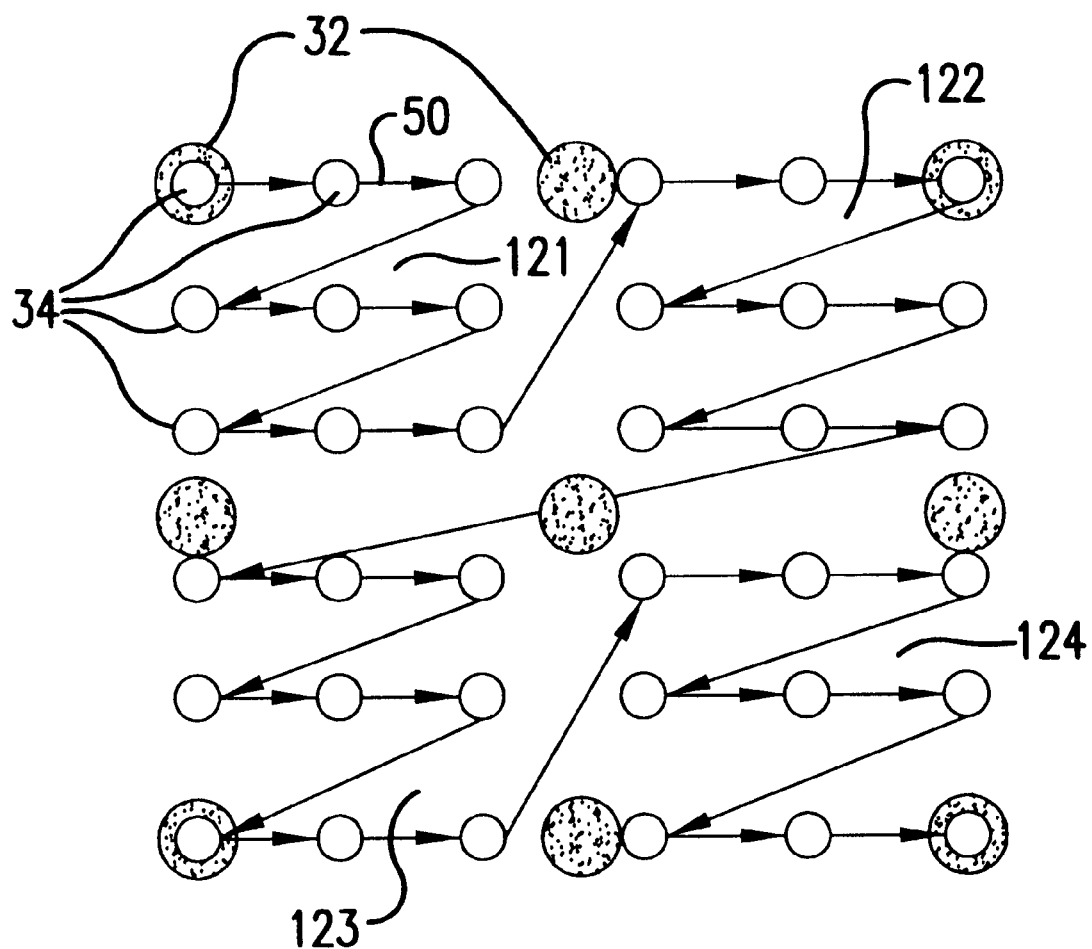
FIG. 4 is an illustrative diagram describing the sequence of supplementary image pixel generation during exemplary operation of a preferred embodiment of the present invention.

The original image pixel locations in the general case do not necessarily coincide with an image pixel location in the resulting resolution enhanced image. This is illustrated in FIG. 4, illustratively showing a set of image pixels 34 in a portion of the resolution enhanced image superimposed on a set of original image pixels 32 (forming blocks 121, 122, 123, 124) in the corresponding original image portion. With the chosen enhancement factor value for this case, the locations of the resolution enhanced image pixels 34 coincide with the locations of only certain ones of the original image pixels 32, the offset of resolution enhanced image pixels 34 relative to the nearest original image pixel 32 varying depending on the block 121, 122, 123, 124 of original image pixels 32 within which they fall.

Interpolation preferably proceeds on a block-by-block basis, with all the supplementary image pixels 34 located within each block being generated before those located within the next block are generated. Once the pixel insert positions for all supplementary image pixels 34 to be formed are known, those pertaining to the supplementary image pixels 34 of a given block are converted to offset coordinate reference positions (Xs, Ys) relative to the block's reference image pixel (preferably defined, as shown in FIG. 2, as the uppermost left-hand original image pixel 32 of the block). The interpolation scheme corresponding to that reference image pixel's classification is then employed to generate for each of the block's supplementary image pixels 34 a luminance, or other intensity parameter, value.

Following the directional arrows 50, then, the luminance value of each supplementary image pixel 34 in block 121 is first generated via the interpolation module 200, 300 selected for that block beginning with the uppermost left-hand supplementary image pixel 34 of that block and concluding with the lowermost right-hand supplementary image pixel 34. The resolution enhancement process then proceeds to the next block 122 with the luminance values of the supplementary image pixels 34 therein being generated beginning with the block's uppermost left-hand supplementary image pixel 34 and concluding with its lowermost right-hand supplementary image pixel 34. This process is repeated for block 123, then for block 124 and any other block in the image field of concern.

Figure 5:
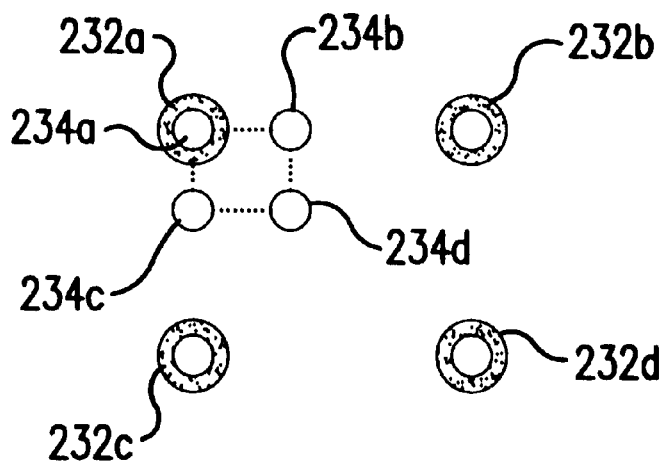
FIG. 5 is an illustrative diagram showing the location of supplementary image pixels during exemplary operation of a preferred embodiment of the present invention.

Referring to FIG. 5, there is shown a diagram illustrating the location of a bilinearly interpolated supplementary image pixel 234 relative to reference image pixel 232a for the block formed by that reference image pixel 232a and its adjacent original image pixels 232b, 232c, and 232d. Bilinear interpolation is an interpolation scheme known in the art, and the particular computational process by which it is carried out is not important to the present invention. It is important in the present invention only to the extent that is the interpolation scheme selected when the reference image pixel of a given block is classified non-oriented.

Generally, bilinear interpolation is carried out for the given block in accordance with the following equation:

$$Pb=(1-Xs)*[(1-Ys)*P0+Ys*P1]+Xs*[(1-Ys)*P2+Ys*P3]$$

Wherein Pb denotes the output luminance, or other intensity parameter, value of the given supplemental image pixel 234; Xs denotes the X-axis coordinate offset from reference image pixel 232a of the pixel insert position for the given supplemental image pixel 234; Ys denotes the Y-axis coordinate offset from reference image pixel 232a of the pixel insert position for the given supplemental image pixel 234; P0 denotes the luminance, or other intensity parameter, value of reference image pixel 232a; P1 denotes the luminance, or other intensity parameter, value of the block's original image pixel 232b located at offset coordinate reference point (1,0) relative to reference image pixel 232a; P2 denotes the luminance, or other intensity parameter, value of the block's original image pixel 232c located at offset coordinate reference point (0,–1) relative to reference image pixel 232a; and, P3 denotes the luminance, or other intensity parameter, value of the block's original image pixel 232d located at offset coordinate reference point (1,–1) relative to reference image pixel 232a.

The computational load of bilinear interpolation module 200 may be minimized in the simple, 'factor of 2' resolution enhancement factor cases. Where the value of the enhancement factor is set to the integer value 2, four supplementary image pixels 234a, 234b, 234c, 234d are generated for each reference image pixel 232a at offset reference coordinate points (Xs, Ys) relative thereto of (0,0), (½,0), (0,–½), and (½,–½). The bilinear interpolation equation is simplified such that the following equations hold:

$$Pb_0=P0$$

$$Pb_1=(P0+P2)/2$$

$$Pb_3=(P0+P1)/2$$

$$Pb_3=(P0+P1+P2+P3)/4$$

Wherein $Pb_0$, $Pb_1$, $Pb_2$, and $Pb_3$ respectively denote the luminance, or other intensity parameter, values for supplementary image pixels 234a, 234b, 234c, and 234d. For resolution enhancement by a greater numeric factor of 2, this computational simplicity may be preserved by repeating the interpolation process, while keeping the enhancement factor equal to 2 for each repetition and treating the supplementary image pixels newly-generated as the original image pixels of the next repetition.

Turning now to the operation of adaptive interpolation module 300, such generally models the intensities of the supplementary image pixels 34 (FIG. 4) in a given block by generating and appropriately applying to known information an optimal set of oriented polynomials. The modeling is accomplished as a function of the dominant orientation parameter α and the pixel insert position (Xs, Ys) of the supplementary image pixel being generated. Preferably, the luminance, or other intensity parameter, value of each supplementary image pixel of a given reference image pixel is generated in accordance with the following general equation:

$$L(Xs,Ys)=\rho_j a_j (y*\cos(\alpha)-x*\sin(\alpha))^{j-1}, j=1,\ldots,d$$

Wherein L (Xs,Ys) denotes the luminance, or other intensity parameter, value of the given supplementary image pixel to be inserted at pixel insert point (Xs,Ys); and, $a_j$ denotes a set of coefficients generated by employing a modeling technique in accordance with the present invention incorporating the luminance, or other intensity parameter, values of the original image pixels in the reference image pixel's neighborhood. The variable d denotes a degree parameter determined based on the value of the dominant orientation parameter α. Preferably, degree parameter d is set to the integer 4 for values of α equal to 0° and 90°, and to the integer value 7 for the other non-axis values of α.

In an embodiment of adaptive interpolation module 300, the luminance value of a supplementary image pixel is found in accordance with the following matrix equation:

$$L(Xs, Ys) = h(H^T H)^{-1} H^T f$$

Wherein h denotes a 1×d matrix with entries defined in accordance with the following equation:

$$h_j = [Ys^* \cos(\alpha) - Xs^* \sin(\alpha)]^{j-1}, j=1, \ldots, d;$$

f is a 16×1 matrix containing the luminance values of the original image pixels in the current reference image pixel's neighborhood; and, H denotes preferably a 16×d matrix having entries:

$$H_{ij} = [Y_{Ni}^* \cos(\alpha) - X_{Ni}^* \sin(\alpha)]^{j-1}, i=1, \ldots, 16, j=1, \ldots, d$$

Wherein $Y_{Ni}$ denotes the Y-axis offset coordinate position relative to the current reference image pixel of the original image pixel $N_i$ in the current reference image pixel's neighborhood; and, $X_{Ni}$ denotes the X-axis offset coordinate position relative to the current reference image pixel of the original pixel $N_i$ in the current reference image pixel's neighborhood.

In accordance with standard matrix symbology, $H^T$ represents the transpose matrix pertaining to matrix H, and $(H^T H)^{-1}$ represents the inverse matrix pertaining to the matrix product $(H^T H)$.

Figure 6:
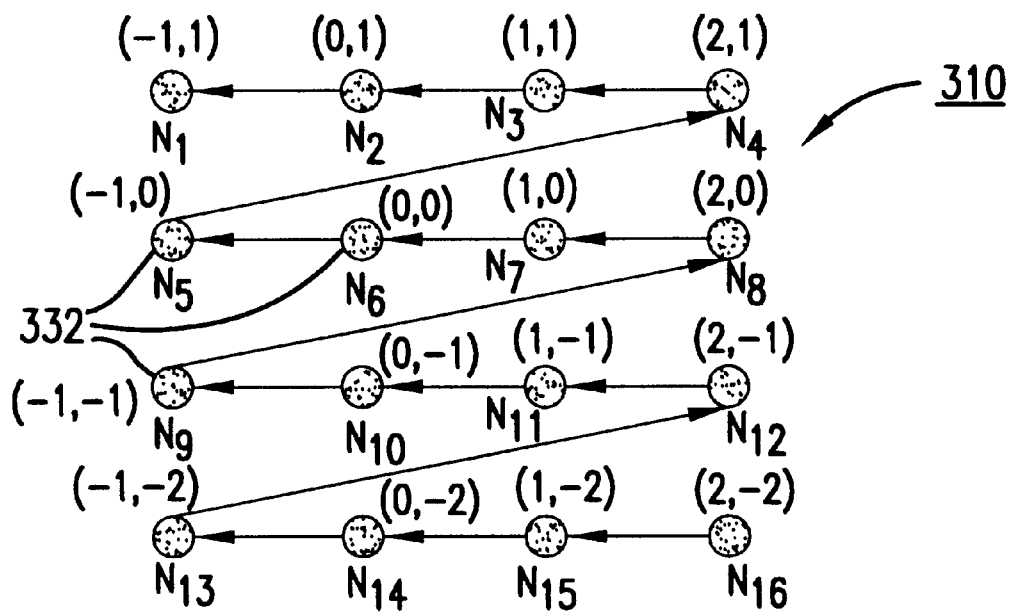
FIG. 6 is an illustrative diagram showing the reference designations of the original image pixels in a neighborhood of a reference image pixel, as defined in a preferred embodiment of the present invention.

Referring to FIG. 6, there is shown for illustration purposes the relative locations and identification designations of original image pixels 332 in neighborhood 310 of the given reference image pixel. For purposes of computation and data management, they are respectively denoted $N_1, \ldots, N_{16}$, beginning with the uppermost left-hand original image pixel 332 and ending with the lowermost right-hand original image pixel 332, as shown. Their respective offset coordinate reference positions (Xs, Ys) are assigned relative to the reference image pixel whose position is taken to be at coordinate reference point (0,0).

As their defining expressions indicate, the entries of matrix h are dependent on the pixel insert position coordinates Xs, Ys of the given supplementary image; however, the entries of matrix H are not. The entries $H_{ij}$ depend only on parameters already known for the current reference image pixel upon classification processing by classification module 100. In fact, each of the entries $H_{ij}$ may be selected from a finite set of values, the locus of which is determined fully by the relative location coordinates of the current neighborhood's original image pixels, the pre-defined sector angles from which the value of the dominant orientation parameter α is selected, and the pre-defined values of the degree parameter d. The finite locus of possible values for that portion of the mathematical expression for L(Xs, Ys) incorporating the various forms of matrix H may then be pre-stored for convenient retrieval in accordance with the applicable values of Xs, Ys and α. That is, of course, if the definition of a reference image pixel's neighborhood pixel locations and the pre-defined sector angles employed in classification module 100 are not subsequently altered.

Accordingly, a table of parametric coefficient sets may be generated and pre-stored in a read only memory (ROM) device within data storage module 20. Each parametric coefficient set may be denoted by a d×16 matrix Z defined as follows:

$$Z = (H^T H)^{-1} H^T$$

The equation for the output luminance, or other output intensity parameter, value Pa (as computed by adaptive interpolation module 300) for a supplementary image pixel insert position (Xs, Ys) relative to the current reference image pixel then reduces to the following matrix equation:

$$L(Xs, Ys) = Pa = Cf$$

Wherein C denotes a 1×16 matrix containing a set of weighting factors and defined in accordance with the following matrix equation:

$$C = hZ.$$

Figure 7:
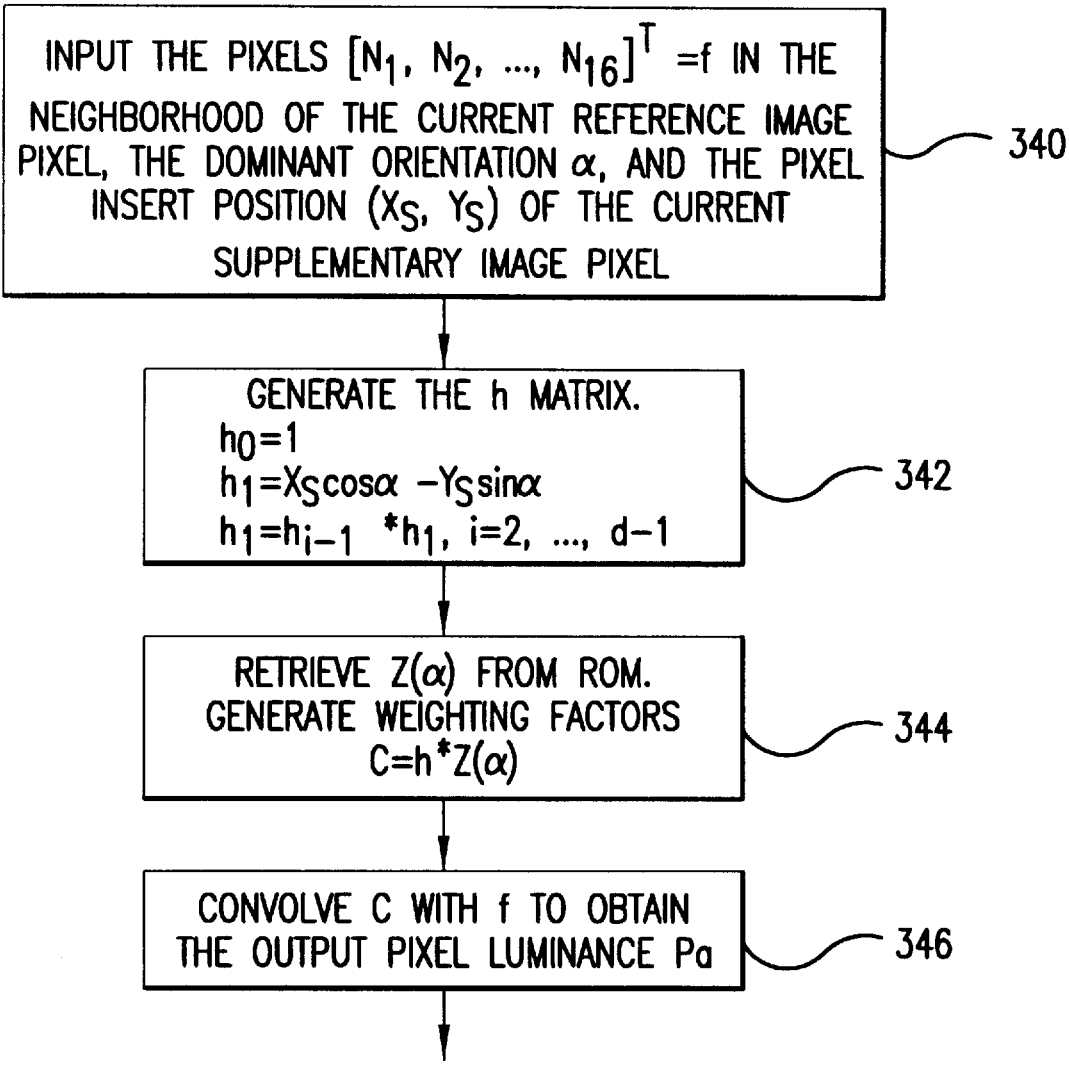
FIG. 7 is a flow diagram illustrating the general operation of an adaptive interpolation module in a preferred embodiment of the present invention.

Turning now to FIG. 7, there is shown a flow diagram illustrating the functional steps performed within adaptive interpolation module 300. The steps 340, 342, 344, and 346 shown occur for each supplementary image pixel to be inserted into the block of a reference image pixel that has been classified oriented by classification module 100. The adaptive interpolation process begins at step 340 with adaptive interpolation module 300 receiving as its inputs the matrix f of the 16 original image pixels in the current reference image pixel's neighborhood and given supplementary image pixel's dominant orientation parameter α and pixel insert position (Xs, Ys). The h matrix is next generated at step 342 for the given supplementary image pixel. At step 344, the parametric coefficient set matrix Z corresponding to the present value of the dominant orientation parameter α is retrieved from the ROM look-up table of data storage module 20. The selected matrix Z of parametric coefficients is combined by matrix multiplication with matrix h to obtain the weighting factor set matrix C. Matrix C is then combined with matrix f at step 346 to obtain the output luminance parameter Pa for the given supplementary image pixel.

As with bilinear interpolation, the computational load in carrying out adaptive interpolation may be minimized in those cases where resolution is to be enhanced by a factor equal to the integer value 2. Since the pixel insert positions for each supplementary image pixel to be generated for the current reference image pixel may, in such cases, be expressed in fixed terms relative to the position of that reference image pixel, the locus of possible values for the entries of matrix h may be pre-computed, combined with the pre-computed entries of the H matrix, and stored in a designated ROM look-up table within data storage module 20. Accordingly, steps 342 and 344 of FIG. 7 may, in such cases, be replaced with the step of simply retrieving from the designated ROM look-up table that set of weighting coefficients corresponding to the given dominant orientation parameter α and pixel insert position (Xs, YS).

Figure 8:
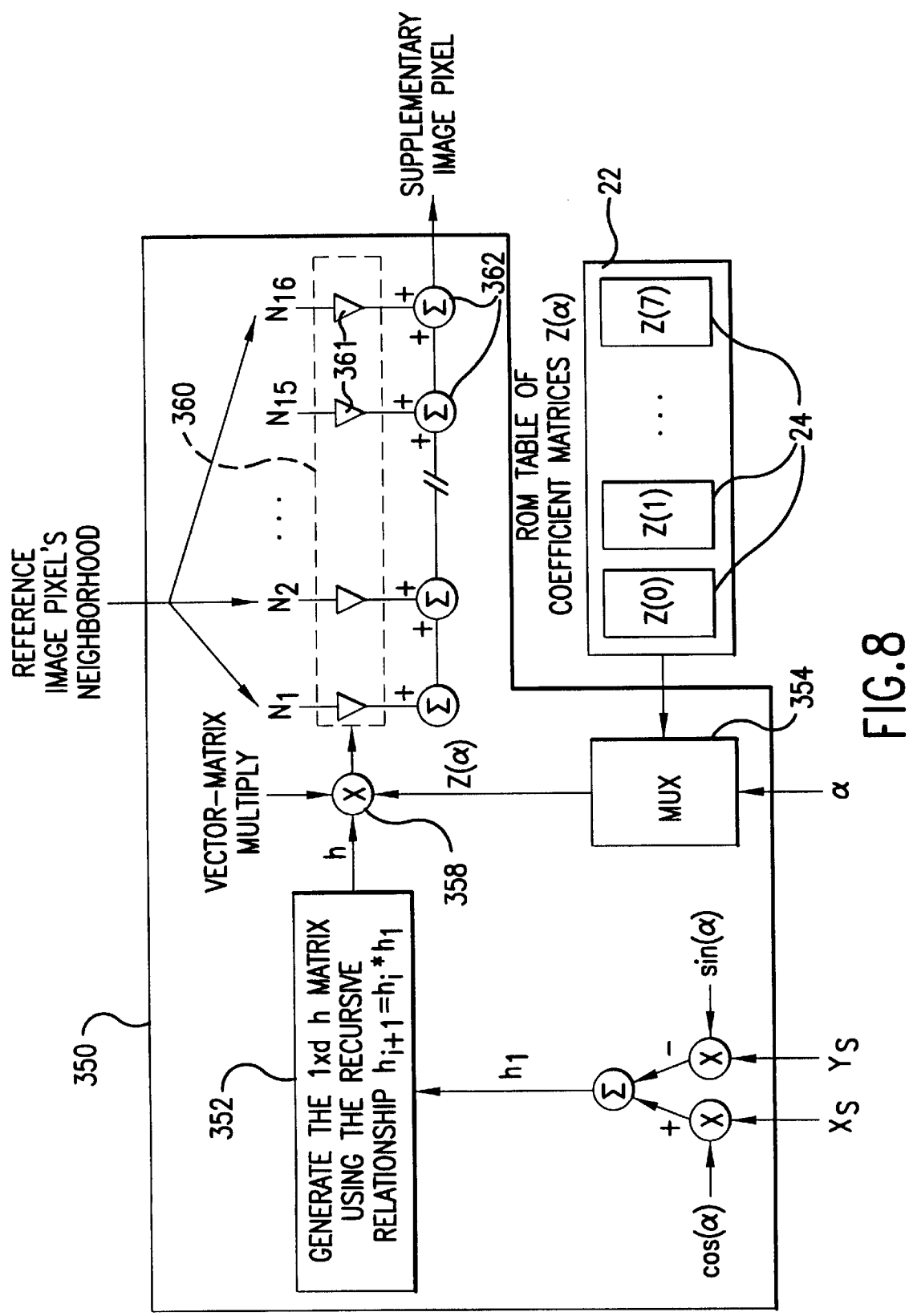
FIG. 8 is a schematic block diagram of an adaptive filter for use in a general operational configuration of an adaptive interpolation module in a preferred embodiment of the present invention.

Referring to FIG. 8, there is shown a schematic block diagram illustrating the architecture of an adaptive filter for performing the adaptive interpolation steps shown in FIG. 7. Adaptive filter 350 includes a recursive combiner 352 which receives as its inputs pixel insert position coordinates Xs, Ys and the cosine and sine constant values for the current dominant orientation parameter α to recursively generate the entries $h_j$ of matrix h. Filter 350 also includes a multiplexer 354 which, upon receiving the current reference image pixel's dominant orientation parameter α as its input, selects the appropriate coefficient set matrix Z from the entries 24 of ROM look-up table in data storage module 20.

The entries 24 in an exemplary embodiment of the present invention are shown in Table 1. Applicable to the general case wherein the given resolution enhancement factor is of an arbitrary value, entries 24 include a d×16 coefficient set matrix Z for each available value of the dominant orientation parameter α. This is indicated in Table 1 by the notational convention Z[α]. Note that since the degree parameter d is preferably set to the integer value 4 for the 0 and 90 (degrees) values of α, and to the integer value 7 for the non-axis values of α; the sizes of coefficient set matrices Z[n] in the Table vary accordingly.

TABLE 1

Z[0]

{−.0156, −.0156, −.0156, −.0156, .1406, .1406, .1406, .1406,
.1406, .1406, .1406, .1406, −.0156, −.0156, −.0156, −.0156;
.0052, .0052, .0052, .0052, −.1406, −.1406, −.1406, −.1406,
.1406, .1406, .1406, .1406, −.0052, −.0052, −.0052, −.0052;
.0156, .0156, .0156, .0156, −.0156, −.0156, −.0156, −.0156,
−.0156, −.0156, −.0156, −.0156, .0156, .0156, .0156, .0156;
−.0052, −.0052, −.0052, −.0052, .0156, .0156, .0156, .0156,
−.0156, −.0156, −.0156, −.0156, .0052, .0052, .0052, .0052}

Z [22.5]

{.0070, −.0573, .0464, −.0087, .2631, .2289, .0730, −.0524,
−.0524, .0730, .2289, .2631, −.0087, .0464, −.0573, .0070;
−.1667, −.0155, .1541, −.0441, .0494, −.1125, −.1843, −.0931,
.0931, .1843, .1125, −.0494, .0441, −.1541, .0155, .1667;
.0931, .0850, −.1125, .0231, −.1406, −.1060, .0410, .1168,
.1168, .0410, −.1060, −.1406, .0231, −.1125, .0850, .0931;
.0315, −.0140, −.0567, .0194, −.0115, .0260, .0389, .0084,
−.0084, −.0389, −.0260, .0115, −.0194, .0567, .0140, −.0315;
−.0176, −.0095, .0304, −.0073, .0190, .0133, −.0103, −.0181,
−.0181, −.0103, .0133, .0190, −.0073, .0304, −.0095, −.0176;
−.0014, .0010, .0030, −.0016, .0006, −.0012, −.0018, −.0001,
.0001, .0018, .0012, −.0006, .0016, −.0030, −.0010, .0014;
.0007, .0003, −.0015, .0005, −.0007, −.0005, .0005, .0007,
.0007, .0005, −.0005, −.0007, .0005, −.0015, .0003, .0007}

Z [45]

{.2500, .0000, .0000, .0000, .0000, .2500, .0000, .0000,
0000, .0000, .2500, 0000, .0000, .0000, .0000, .2500;
0000, −.1768, .0530, −.0118, .1768, .0000, −.1768, .0530,
−.0530, .1768, .0000, −.1768, .0118, −.0530, .1768, .0000;
−.1701, .1250, −.0188, .0028, .1250, −.1701, .1250, −.0188,
−.0188, .1250, −.1701, .1250, .0028, −.0188, .1250, −.1701;
.0000, .0319, −.0295, .0074, −.0319, .0000, .0319, −.0295,
.0295, −.0319, .0000, .0319, −.0074, .0295, −.0319, .0000;
.0243, −.0226, .0104, −.0017, −.0226, .0243, −.0226, .0104,
.0104, −.0226, .0243, −.0226, −.0017, .0104, −.0226, .0243;
.0000, −.0012, .0015, −.0007, .0012, .0000, −.0012, .0015,
−.0015, .0012, .0000, −.0012, .0007, −.0015, .0012, .0000;
−.0009, .0009, −.0005, .0002, .0009, −.0009, .0009, −.0005,
−.0005, .0009, −.0009, .0009, .0002, −.0005, .0009, −.0009}

Z [67.5]

{.0070, .2631, −.0524, −.0087, −.0573, .2289, .0730, .0464,
.0464, .0730, .2289, −.0573, −.0087, −.0524, .2631, .0070;
.1667, −.0494, −.0931, −.0441, .0155, .1125, −.1843, .1541,
−.1541, .1843, −.1125, −.0155, .0441, .0931, .0494, −.1667;
.0931, −.1406, .1168, .0231, .0850, −.1060, .0410, −.1125,
−.1125, .0410, −.1060, .0850, .0231, .1168, −.1406, .0931;
−.0315, .0115, .0084, .0194, .0140, −.0260, .0389, −.0567,
.0567, −.0389, .0260, −.0140, −.0194, −.0084, −.0115, .0315;
−.0176, .0190, −.0181, −.0073, −.0095, .0133, −.0103, .0304,
.0304, −.0103, .0133, −.0095, −.0073, −.0181, .0190, −.0176;
.0014, −.0006, −.0001, −.0016, −.0010, .0012, −.0018, .0030,
−.0030, .0018, −.0012, .0010, .0016, .0001, .0006, −.0014;
.0007, −.0007, .0007, .0005, .0003, −.0005, .0005, −.0015,
−.0015, .0005, −.0005, .0003, .0005, .0007, −.0007, .0007}

Z [90]

{−.0156, .1406, .1406, −.0156, −.0156, .1406, .1406, −.0156,
−.0156, .1406, .1406, −.0156, −.0156, .1406, .1406, −.0156;
−.0052, .1406, −.1406, .0052, −.0052, .1406, −.1406, .0052,
−.0052, .1406, −.1406, .0052, −.0052, .1406, −.1406, .0052;
.0156, −.0156, −.0156, .0156, .0156, −.0156, −.0156, .0156,
.0156, −.0156, −.0156, .0156, .0156, −.0156, −.0156, .0156;
.0052, −.0156, .0156, −.0052, .0052, −.0156, .0156, −.0052,
.0052, −.0156, .0156, −.0052, .0052, −.0156, .0156, −.0052}

Z [112.5]

{−.0087, −.0524, .2631, .0070, .0464, .0730, .2289, −.0573,
−.0573, .2289, .0730, .0464, .0070, .2631, −.0524, −.0087;

TABLE 1-continued

.0441, .0931, .0494, −.1667, −.1541, .1843, −.1125, −.0155,
.0155, .1125, −.1843, .1541, .1667, −.0494, −.0931, −.0441;
.0231, .1168, −.1406, .0931, −.1125, .0410, −.1060, .0850,
.0850, −.1060, .0410, −.1125, .0931, −.1406, .1168, .0231;
−.0194, −.0084, −.0115, .0315, .0567, −.0389, .0260, −.0140,
.0140, −.0260, .0389, −.0567, −.0315, .0115, .0084, .0194;
−.0073, −.0181, .0190, −.0176, .0304, −.0103, .0133, −.0095,
−.0095, .0133, −.0103, .0304, −.0176, .0190, −.0181, −.0073;
.0016, .0001, .0006, −.0014, −.0030, .0018, −.0012, .0010,
−.0010, .0012, −.0018, .0030, .0014, −.0006, −.0001, −.0016;
.0005, .0007, −.0007, .0007, −.0015, .0005, −.0005, .0003,
.0003, −.0005, .0005, −.0015, .0007, −.0007, .0007, .0005}

Z [135]

{.0000, .0000, .0000, .2500, .0000, .0000, .2500, .0000,
.0000, .2500, .0000, .0000, .2500, .0000, .0000, .0000;
.0118, −.0530, .1768, .0000, −.0530, .1768, .0000, −.1768,
.1768, .0000, −.1768, .0530, .0000, −.1768, .0530, −.0118;
.0028, −.0188, .1250, −.1701, −.0188, .1250, −.1701, .1250,
.1250, −.1701, .1250, −.0188, −.1701, .1250, −.0188, .0028;
−.0074, .0295, −.0319, .0000, .0295, −.0319, .0000, .0319,
−.0319, .0000, .0319, −.0295, .0000, .0319, −.0295, .0074;
−.0017, .0104, −.0226, .0243, .0104, −.0226, .0243, −.0226,
−.0226, .0243, −.0226, .0104, .0243, −.0226, .0104, −.0017;
.0007, −.0015, .0012, .0000, −.0015, .0012, .0000, −.0012,
.0012, .0000, −.0012, .0015, .0000, −.0012, .0015, −.0007;
.0002, −.0005, .0009, −.0009, −.0005, .0009, −.0009, .0009,
.0009, −.0009, .0009, −.0005, −.0009, .0009, −.0005, .0002}

Z [157.5]

{−.0087, .0464, −.0573, .0070, −.0524, .0730, .2289, .2631,
.2631, .2289, .0730, −.0524, .0070, −.0573, .0464, −.0087;
.0441, −.1541, .0155, .1667, .0931, .1843, .1125, −.0494,
.0494, −.1125, −.1843, −.0931, −1667, −.0155, .1541, −.0441;
.0231, −.1125, .0850, .0931, .1168, .0410, −.1060, −.1406,
−.1406, −.1060, .0410, .1168, .0931, .0850, −.1125, .0231;
−.0194, .0567, .0140, −.0315, −.0084, −.0389, −.0260, .0115,
−.0115, .0260, .0389, .0084, .0315, −.0140, −.0567, .0194;
−.0073, .0304, −.0095, −.0176, −.0181, −.0103, .0133, .0190,
.0190, .0133, −.0103, −.0181, −.0176, −.0095, .0304, −.0073;
.0016, −.0030, −.0010, .0014, .0001, .0018, .0012, −.0006,
.0006, −.0012, −.0118, −.0001, −.0014, .0010, .0030, −.0016;
.0005, −.0015, .0003, .0007, .0007, .0005, −.0005, −.0007,
−.0007, −.0005, .0005, .0007, .0007, .0003, −.0015, .0005}

The retrieved coefficient set matrix Z is then combined at multiplier 358 with the matrix h output of recursive combiner 352. The data matrix output of multiplier 358 is then passed to linear combiner 360 whereby each entry of the data matrix output is multiplied with the luminance value of a corresponding original image pixel $N_1$–$N_{16}$ in the current neighborhood at combining elements 361, then summed together by summers 362. The output luminance parameter Pa is thus generated for the supplementary image pixel to be located at coordinate reference position (Xs, Ys) relative to the position of the current reference image pixel.

The particular physical implementation of the exemplary architecture shown in FIG. 8 is not important to the present invention. The functional entities shown therein may accordingly be realized by use of any suitable components and fabrication techniques known in the art. Moreover, the relative physical arrangements of the various functional entities may be freely modified as necessitated by the constraints imposed on a given physical implementation. ROM look-up table 22, for instance, need not be formed within designated data storage module 100, but rather may be formed either as an independent auxiliary memory device, or as a dedicated part of adaptive filter 350.

Figure 9:
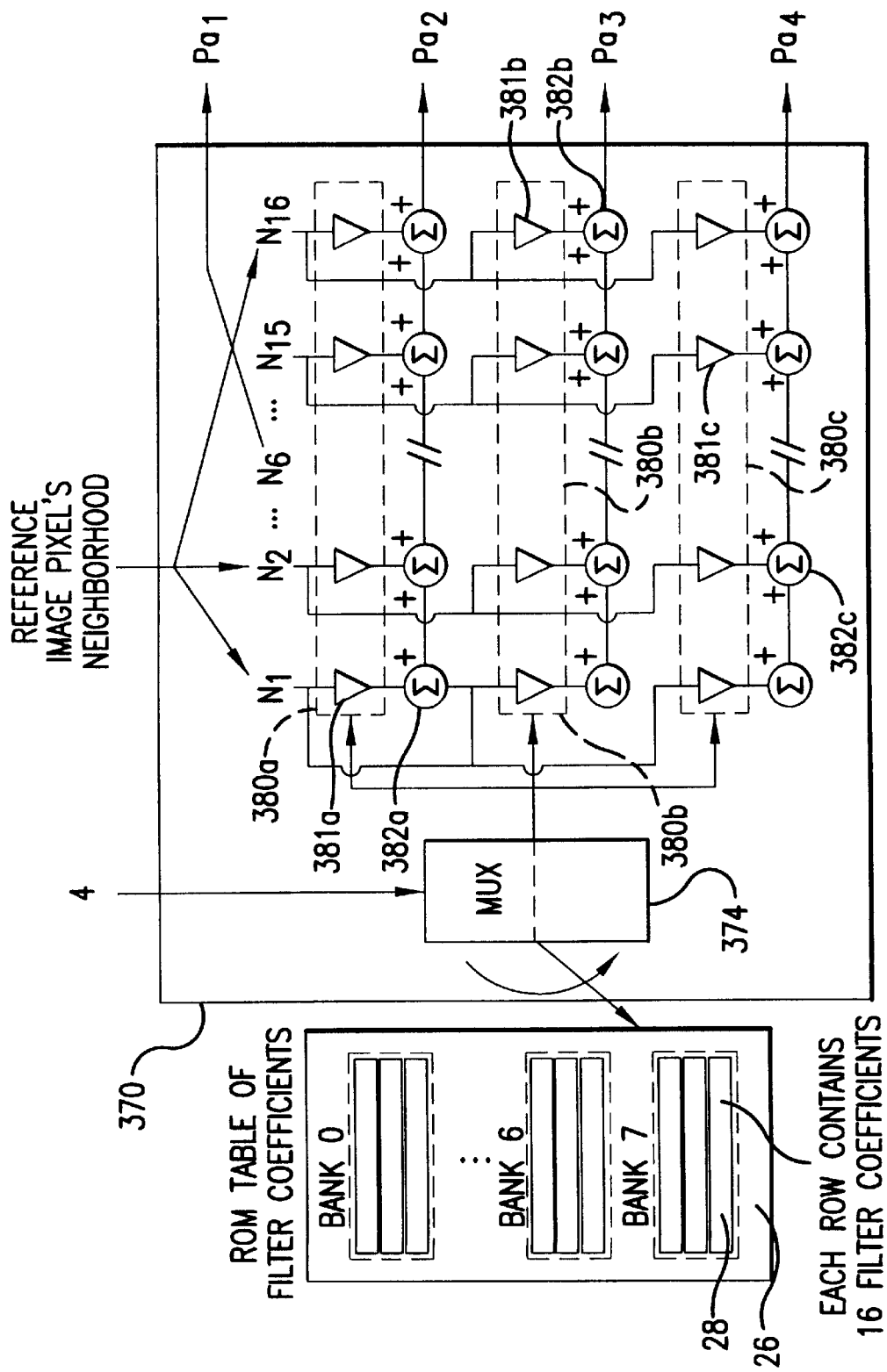
FIG. 9 is a schematic block diagram of an adaptive filter for use in a simplified operational configuration of an adaptive interpolation module in a preferred embodiment of the present invention.

Referring to FIG. 9, there is shown an exemplary embodiment of an adaptive filter architecture of the present invention simplified for the case of a resolution enhancement factor equal to the integer value 2. Adaptive filter 370 in such a case would simply include a multiplexer 374 and three linear combiner modules 380a, 380b, and 380c for respective generation of the luminance values pertaining to the three supplementary image pixels surrounding the current reference image pixel. The need for recursive combiner 352 and matrix multiplier 358 found in the architecture of FIG. 8 is obviated in this simple case as the entries of the h matrix are already accounted for in the banks (a separate bank corresponding to each value of α) of weighting filter coefficient entries 28 in ROM look-up table 26.

During operation, multiplexer 374 receives dominant orientation parameter α as its input and selects responsive thereto from ROM look-up table 26 the proper bank of weighting filter coefficient entries 28. The three weighting filter coefficient sets of the selected filter bank are then respectively passed to their corresponding combiners 380a–380c. The sixteen weighting coefficients in each of the three filter coefficient sets is combined with the luminance values of the neighborhood original image pixels $N_1$–$N_{16}$ via the given multipliers 381a–381c, then summed together by summers 382a–382c to generate the corresponding supplementary image pixel luminance value Pa.

The three weighting filter coefficient sets in an exemplary embodiment of the present invention for the simplified case (wherein the resolution enhancement factor is set to the integer value 2) is shown in Table 2. The three weighting filter coefficient sets in each bank are denoted $C_1[\alpha]$, $C_2[\alpha]$, and $C_3[\alpha]$ which correspond respectively to the supplemental image pixels at pixel insert positions (½, 0), (0, −½), and (½, −½) relative to the position of the given reference image pixel.

TABLE 2

Bank 0

| | |
|---|---|
| $C_1$ [0]: | {−.0156, −.0156, −.0156, −.0156, .1406, .1406, .1406, .1406, .1406, .1406, .1406, .1406, −.0156, .0156, −.0156, −.0156} |
| $C_2$ [0]: | {−.0156, −.0156, −.0156, −.0156, .1406, .1406, .1406, .1406, .1406, .1406, .1406, .1406, −.0156, .0156, −.0156, −.0156} |
| $C_3$ [0]: | {.0000, .0000, .0000, .0000, .2500, .2500, .2500, .2500, .0000, .0000, .0000, .0000, .0000, .0000, .0000, .0000} |

Bank 1

| | |
|---|---|
| $C_1$ [22.5]: | {.0070, −.0573, .0464, −.0087, .2631, .2289, .0730, .0524, −.0524, .0730, .2289, .2631, −.0087, .0464, .0573, .0070} |
| $C_2$ [22.5]: | {−.0148, −.0517, .0864, −.0212, .2612, .1720, .0104, −.0709, −.0006, .1471, .2552, .2247, .0103, .0252, −.0383, .0823} |
| $C_3$ [22.5]: | {.2042, .0332, −.1280, .0326, .1197, .2320, .2416, .1140, −.0449, −.0440, .0635, .1935, −.0204, .0713, .0161, −.0559} |

Bank 2

| | |
|---|---|
| $C_1$ [45]: | {.2500, .0000, .0000, .0000, .0000, .2500, .0000, .0000, .0000, .0000, .2500, .0000, .0000, .0000, .0000, .2500} |
| $C_2$ [45]: | {.1709, −.0570, .0205, −.0049, .1709, .1709, −.0570, .0205, −.0342, .1709, .1709, −.0570, .0068, −.0342, .1709, .1709} |
| $C_3$ [45]: | {.1709, .1709, −.0342, .0068, −.0570, .1709, .1709, −.0342, .0205, −.0570, .1709, .1709, −.0049, .0205, −.0570, .1709} |

Bank 3

| | |
|---|---|
| $C_1$ [67.5]: | {.0070, .2631, −.0524, −.0087, −.0573, .2289, .0730, .0464, .0464, .0730, .2289, −.0573, −.0087, −.0524, .2631, .0070} |
| $C_2$ [67.5]: | .2042, .1197, −.0449, −.0204, .0332, .2320, −.0400, .0713, −.1280, .2416, .0635, −.0161, .0326, .1140, .1935, −.0559} |
| $C_3$ [67.5]: | {−.0418, .2612, −.0006, .0103, −.0517, .1720, .1471, −.0252, .0864, .0104, .2552, −.0383, −.0212, .0709, .2247, .0823} |

Bank 4

| | |
|---|---|
| $C_1$ [90]: | {−.0156, .1406, .1406, −.0156, −.0156, .1406, .1406, −.0156, −.0156, .1406, .1406, −.0156, −.0156, .1406, .1406, −.0156} |
| $C_2$ [90]: | {.0000, .2500, .0000, .0000, .0000, .2500, .0000, .0000, .0000, .2500, .0000, .0000, .0000, .2500, .0000, .0000} |
| $C_3$ [90]: | {−.0156, .1406, .1406, −.0156, −.0156, .1406, .1406, −.0156, −.0156, .1406, .1406, −.0156, −.0156, .1406, .1406, −.0156} |

Bank 5

| | |
|---|---|
| $C_1$ [112.5]: | {−.0087, −.0524, .2631, .0070, .0464, .0730, .2289, −.0573, −.0573, .2289, .0730, .0464, .0070, .2631, −.0524, −.0087} |
| $C_2$ [112.5]: | {.0326, .1140, .1935, −.0559, −.1280, .2416, .0635, .0161, .0332, .2320, −.0400, .0713, .2042, .1197, .0449, −.0204} |
| $C_3$ [112.5]: | {.0103, −.0006, .2612, −.0418, −.0252, .1471, .1720, .0517, −.0383, .2552, .0104, .0864, .0823, .2247, .0709, −.0212} |

Bank 6

| | |
|---|---|
| $C_1$ [135]: | {.0000, .0000, .0000, .2500, .0000, .0000, .2500, .0000, .0000, .2500, .0000, .0000, .2500, .0000, .0000, .0000} |
| $C_2$ [135]: | {.0068, −.0342, .1709, .1709, −.0342, .1709, .1709, −.0570, .1709, .1709, −.0570, .0205, .1709, .0570, .0205, −.0049} |
| $C_3$ [135]: | {.0068, −.0342, .1709, .1709, −.0342, .1709, .1709, −.0570, .1709, .1709, −.0570, .0205, .1709, .0570, .0205, −.0049} |

Bank 7

| | |
|---|---|
| $C_1$ [157.5] | {−.0087, .0464, −.0573, .0070, −.0524, .0730, .2289, .2631, .2631, .2289, .0730, −.0524, .0070, −.0573, .0464, −.0087} |
| $C_2$ [157.5] | {.0103, −.0252, −.0383, .0823, −.0006, .1471, .2552, .2247, .2612, .1720, .0104, −.709, −.0418, −.0517, .0864, −.0212} |
| $C_3$ [157.5] | {.0326, −.1280, .0332, .2042, .1140, .2416, .2320, .1197, .1935, .0635, −.0400, −.0449, −.0559, −.0161, .0713, −.0204} |

While the present invention is not in any way limited thereto, the streamlining in the computational process afforded by setting the resolution enhancement factor to the integer value 2 is, in most applications, an important consideration given the relaxation of processing speed requirements it invariably affords. Thus, it may be beneficial to employ a modular approach in scaling a video image by a selected resolution enhancement factor. In those cases where the selected enhancement factor is a numeric factor of the integer value 2, the scaling may be realized recursively, scaling as many times as is necessary by use of the subject adaptive resolution enhancement system 1 set with an enhancement factor of 2. Where the video image is to be scaled by a factor other than a numeric factor of 2, the computational load may nevertheless be optimally minimized by again recursively invoking the subject adaptive resolution enhancement system 1 set with the enhancement factor 2 until further scaling cannot be performed without exceeding the ultimately desired scale. At that point, the general case configuration of the subject adaptive resolution enhancement system 1 may then be invoked with the enhancement factor set accordingly.

Figure 10:
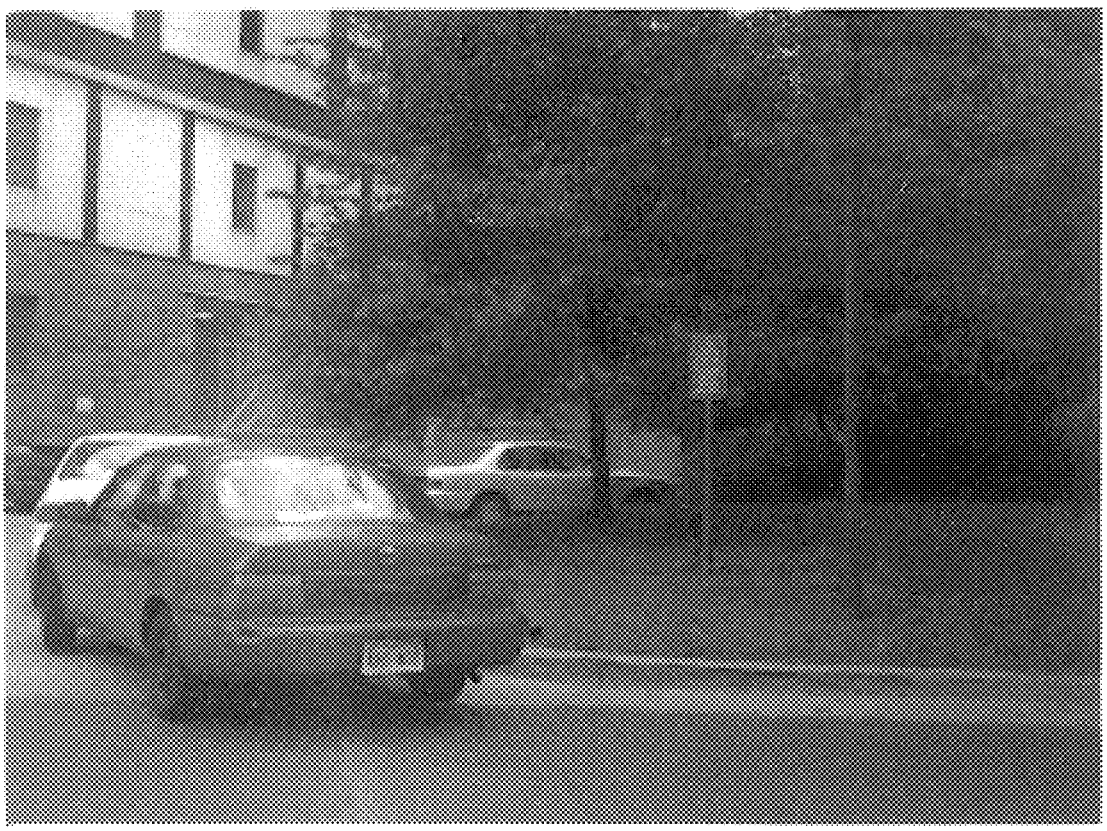
FIG. 10 is a photographic representation of a sample digital video image.
Figure 11:
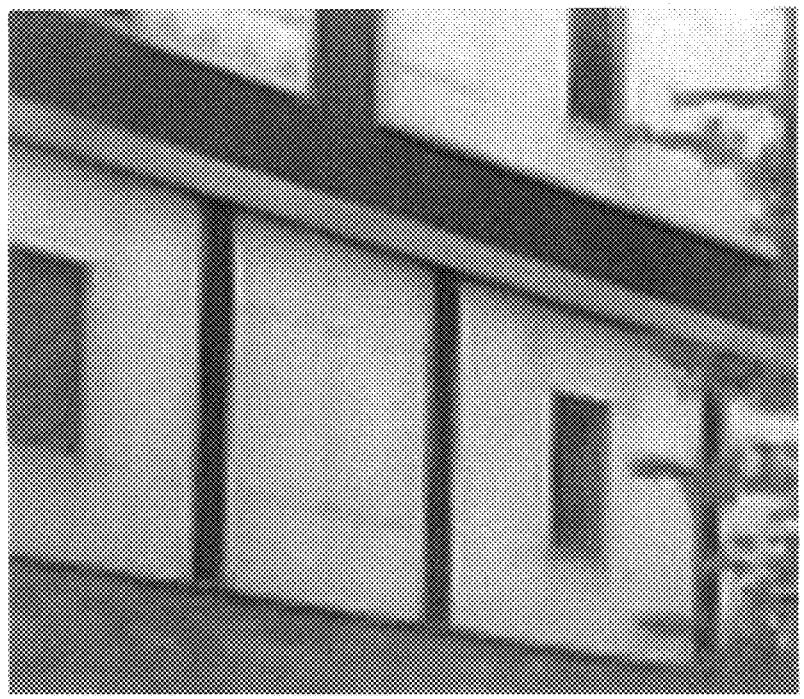
FIG. 11 is a photographic representation of a portion of the digital video image of FIG. 10 enhanced in resolution by use of a preferred embodiment of the present invention; and, FIG. 12 is a photographic representation of the same portion of the digital video image of FIG. 10 shown in FIG. 11, but with the resolution enhanced by use of a prior art bilinear interpolation technique.
Figure 12:

Turning now to FIGS. 10–12, FIG. 10 is a photographic representation of a sample original video image at a 96×83 image pixel resolution. FIG. 11 shows an upper-left corner portion of the original video image in FIG. 10 expanded in scale and enhanced to a resolution of 332×287 image pixels in accordance with the present invention. The enhancement in image fidelity obtained by use of the subject resolution enhancement system 1 is readily apparent when compared with the photographic representation shown in FIG. 12 of the same original image portion expanded by the same scale and to the same resolution, but by employing bilinear interpolation only, as typically done in the prior art.

Although this invention has been described in connection with specific forms and embodiments thereof, it will be appreciated that various modifications other than those discussed above may be resorted to without departing from the spirit or scope of the invention. For example, pixel intensity parameters other than luminance may be generated, equivalent elements or functional steps may be substituted for those specifically shown and described, certain features may be used independently of other features, and in certain cases, particular combinations of functional steps may be reversed or interposed, all without departing from the spirit or scope of the invention as defined in the appended Claims.

What is claimed is:

1. A method of adaptively enhancing by a predetermined enhancement factor the resolution of a video image characterized by a plurality of original image pixels of predetermined intensities comprising the steps of:
   (a) establishing a primary image field containing at least a portion of said original image pixels of said video image;
   (b) iteratively designating each said original image pixel in said primary image field as a reference image pixel;
   (c) defining for said reference image pixel a neighborhood containing a plurality of said original image pixels;
   (d) designating for said reference image pixel, responsive to at least a portion of said predetermined original image pixel intensities in said neighborhood thereof, one of a plurality of predefined image classifications;
   (e) selecting for said reference image pixel, responsive to said image classification designation, one of a plurality of predefined interpolation schemes for generating at least one supplemental image pixel, said predefined interpolation schemes including an adaptive interpolation scheme for generating said supplemental image pixel as a function of a plurality of adaptation parameters, said adaptation parameters including a dominant orientation parameter and a set of parametric coefficients, said dominant orientation parameter being determined responsive to at least a portion of said predetermined original image pixel intensities in said neighborhood; and,
   (f) generating by use of said interpolation scheme selected each said supplemental image pixel of said reference image pixel for insert at a pre-selected pixel insert position.

2. The method of adaptively enhancing the resolution of a video image as recited in claim 1 further comprising the steps of:
   (a) referencing said original image pixels of said video image in a Cartesian coordinate system having orthogonal x and y coordinate axes; and,
   (b) defining for said reference image pixel a block containing a plurality of said original image pixels, said block being encompassed by said neighborhood.

3. The method of adaptively enhancing the resolution of a video image as recited in claim 2 wherein said predefined image classifications include an oriented classification and a non-oriented classification.

4. The method of adaptively enhancing the resolution of a video image as recited in claim 3 wherein said plurality of predefined interpolation schemes includes a bilinear interpolation scheme for generating each said supplemental image pixel of said reference image pixel responsive to said predetermined intensities of said original image pixels in said block, said bilinear interpolation scheme being selected responsive to said non-oriented classification for said reference image pixel.

5. The method of adaptively enhancing the resolution of a video image as recited in claim 4 further comprising the steps of:
   (a) establishing a secondary image field of original image pixels outside said primary image field for delineating predetermined ones of said original image pixels characterizing an image boundary portion;
   (b) iteratively designating each said original image pixel in said secondary image field as said reference image pixel; and,
   (c) designating said non-oriented classification for said reference image pixel.

6. The method of adaptively enhancing the resolution of a video image as recited in claim 4 wherein said step of selecting one of said plurality of predefined interpolation schemes for said reference image pixel includes the step of selecting said adaptive interpolation scheme responsive to said oriented classification for said reference image pixel.

7. The method of adaptively enhancing the resolution of a video image as recited in claim 6 wherein said step of designating one of said predefined image classifications for said reference image pixel includes the steps of:
   (a) establishing a predetermined variation threshold level;
   (b) generating an intensity variation parameter indicative of the range of deviation in said predetermined intensities of said original image pixels within said neighborhood;
   (c) testing said neighborhood for the presence of a substantially delineated edge portion of said video image when said intensity variation parameter exceeds said variation threshold level, said testing alternatively generating a positive test result and a negative test result;
   (d) designating said oriented classification for said reference image pixel responsive to said positive test result; and,
   (e) generating said dominant orientation parameter responsive to said positive test result.

8. The method of adaptively enhancing the resolution of a video image as recited in claim 7 wherein said step of testing said neighborhood of said reference image pixel includes the steps of:
   (a) establishing a predetermined recurrence count threshold level;
   (b) generating for each said original image pixel in said neighborhood a quantized orientation parameter;
   (c) establishing a recurrence count of the most highly recurrent value of said quantized orientation parameter within said neighborhood;
   (d) generating said positive test result when said recurrence count exceeds said recurrence count threshold level; and,
   (e) generating responsive to said positive test result said dominant orientation parameter of said reference image pixel as a function of said most highly recurrent value of said quantized orientation parameter.

9. The method of adaptively enhancing the resolution of a video image as recited in claim 8 wherein said block includes said reference image pixel and three of said original image pixels adjacent thereto, said three original image pixels being positioned at offset coordinate reference points (1,0), (1,−1), and (0,−1) relative to the position of said reference image pixel.

10. The method of adaptively enhancing the resolution of a video image as recited in claim 9 wherein said bilinear interpolation scheme includes the step of generating an output intensity parameter for each said supplemental image pixel of said reference image pixel in accordance with the following equation:

$$Pb=(1-Xs)*[(1-Ys)*P0+Ys*P1]+Xs*[(1-Ys)*P2+Ys*P3]$$

wherein, (a) Pb denotes said output intensity parameter of said supplemental image pixel;

(b) Xs denotes the x-axis coordinate offset of said pixel insert position of said supplemental image pixel relative to the position of said reference image pixel;

(c) Ys denotes the y-axis coordinate offset of said pixel insert position of said supplemental image pixel relative to the position of said reference image pixel;

(d) P0 denotes said predetermined intensity of said reference image pixel in said block;

(e) P1 denotes said predetermined intensity of said original image pixel in said block at said (1,0) offset coordinate reference point;

(f) P2 denotes said predetermined intensity of said original image pixel in said block at said (0,−1) offset coordinate reference point; and, (g) P3 denotes said predetermined intensity of said original image pixel in said block at said (1,−1) offset coordinate reference point.

11. The method of adaptively enhancing the resolution of a video image as recited in claim 9 wherein said neighborhood of said reference image pixel in said primary image field includes said block and twelve of said original image pixels adjacent said block.

12. The method of adaptively enhancing the resolution of a video image as recited in claim 11 wherein said neighborhood includes said original image pixels positioned at offset coordinate reference points (−1,1), (0,1), (1,1), (2,1), (−1,0), (0,0), (1,0), (2,0), (−1,−1), (0,−1), (1,−1), (2,−1), (−1,−2), (0,−2), (1,−2), and (2,−2) relative to the position of said reference image pixel, said original image pixels of said neighborhood being denoted respectively by $N_1, \ldots, N_{16}$.

13. The method of adaptively enhancing the resolution of a video image as recited in claim 12 wherein said adaptive interpolation scheme includes the steps of:

(a) establishing for said reference image pixel a degree parameter in a manner dependent on said dominant orientation parameter thereof;

(b) generating said set of parametric coefficients for each said supplemental image pixel in a manner dependent on a plurality of parameters including said dominant orientation parameter and said degree parameter;

(c) modifying said set of parametric coefficients responsive to said pixel insert position to form a set of weighting factors; and, (d) generating an output intensity parameter for each said supplemental image pixel by combining said set of weighting factors with said predetermined intensities of said original image pixels in said neighborhood.

14. The method of adaptively enhancing the resolution of a video image as recited in claim 13 wherein said step of generating said set of parametric coefficients includes the steps of:

(a) forming for said reference image pixel a first matrix f including entries defined by said predetermined intensities of said original image pixels $N_1, \ldots, N_{16}$ in said neighborhood;

(b) forming for said reference image pixel a second matrix H including entries $H_{ij}$ defined in accordance with the following equation:

$$H_{ij}=[Y_{Ni}*\cos(\alpha)-X_{Ni}*\sin(\alpha)]^{j-1}$$

wherein, (1) i=1, . . . , 16;
(2) j=1, . . . , d;
(3) d denotes said degree parameter;
(4) α denotes said dominant orientation parameter;
(5) $Y_{Ni}$ denotes the y-axis offset coordinate position of said original image pixel $N_i$ in said neighborhood relative to the position of said reference image pixel; and,
(6) $X_{Ni}$ denotes the x-axis offset coordinate position of said original image pixel $N_i$ in said neighborhood relative to the position of said reference image pixel;

(c) forming for said reference image pixel a third matrix Z in accordance with the following matrix equation:

$$Z=(H^TH)^{-1}H^T$$

wherein said matrix Z contains said set of parametric coefficients.

15. The method of adaptively enhancing the resolution of a video image as recited in claim 14 wherein said step of modifying said set of parametric coefficients includes the steps of:

(a) forming for each said supplemental image pixel a third matrix h including entries $h_j$ defined in accordance with the following equation:

$$h_j=[Ys*\cos(\alpha)-Xs*\sin(\alpha)]^{j-1}$$

wherein, (1) Xs denotes the x-axis coordinate offset of said pixel insert position of said supplemental image pixel relative to the position of said reference image pixel;
(2) Ys denotes the y-axis coordinate offset of said pixel insert position of said supplemental image pixel relative to the position of said reference image pixel; and, (b) forming for each said supplemental image pixel a fourth matrix C in accordance with the following matrix equation:

$$C=hZ$$

wherein said matrix C includes said set of weighting factors.

16. The method of adaptively enhancing the resolution of a video image as recited in claim 15 wherein said step of generating said output intensity parameter of said supplemental image pixel includes the step of combining said set of weighting factors with said predetermined intensities of said neighborhood original image pixels in accordance with the following matrix equation:

$$Pa=Cf$$

wherein Pa denotes said output intensity parameter.

17. The method of adaptively enhancing the resolution of a video image as recited in claim 8 wherein said step of generating said quantized orientation parameter for each said original image pixel in said neighborhood includes the steps of:

(a) iteratively designating each said original image pixel in said neighborhood as an orientation reference;

(b) defining for said orientation reference at least a first reference set and a second reference set, each of said first and second reference sets containing a plurality of said original image pixels adjacent said orientation reference;

(c) generating for said orientation reference an orientation angle as a function of said predetermined intensities of said original image pixels in said reference sets; and, (d) generating said quantized orientation parameter by quantizing said orientation angle relative to a plurality of predefined quantization sectors.

18. The method of adaptively enhancing the resolution of a video image as recited in claim 17 wherein said step of generating said quantized orientation parameter by quantizing said orientation angle includes the steps of:

(a) defining eight quantization sectors characterized respectively by a plurality of predetermined sector angles, each of said quantization sectors having an approximate radial width of 22.5 degrees;

(b) defining a unique denotation for each of said quantization sectors;

(c) selecting one of said quantization sectors in a manner dependent on said orientation angle; and, (d) assigning said unique denotation of said selected quantization sector as said quantized orientation parameter of said orientation reference.

19. The method of adaptively enhancing the resolution of a video image as recited in claim 18 wherein said predetermined sector angles are defined respectively by 0.0, 22.5, 45.0, 67.5, 90.0, 112.5, 135.0, and 157.5 degrees.

20. The method of adaptively enhancing the resolution of a video image as recited in claim 18 wherein said predetermined sector angle corresponding to said quantization sector denoted by said most highly recurrent quantized orientation parameter value is assigned as said dominant orientation parameter of said reference image pixel responsive to said positive test result.

21. The method of adaptively enhancing the resolution of a video image as recited in claim 17 wherein said step of generating said orientation angle for each said orientation reference includes the steps of:

(a) generating first and second factors Qx, Qy in accordance with the following equations:

$$Qx = Pq_1 + 2*Pq_2 + P_3 - Pq_4 - 2*Pq_5 - Pq_6$$

$$Qy = Pq_1 + 2*Pq_7 + Pq_4 - Pq_3 - 2*Pq_8 - Pq_6$$

wherein, $Pq_1$, $Pq_2$, $Pq_3$, $Pq_4$, $Pq_5$, $Pq_6$, $Pq_7$, and $Pq_8$ respectively denote said predetermined intensities of said original image pixels positioned at offset coordinate reference points (1,1), (0,1), (−1,1), (1,−1), (0,−1), (−1,−1), (1,0), and (−1,0) relative to the position of said orientation reference; and, (b) generating said orientation angle for said orientation reference in accordance with the following equation:

$$A = [-57.2958 * \tan^{-1}(Qx/Qy)]_{mod\ 180}$$

wherein, A denotes said orientation angle.

22. The method of adaptively enhancing the resolution of a video image as recited in claim 13 wherein said step of generating said quantized orientation parameter for each said original image pixel in said neighborhood includes the steps of:

(a) iteratively designating each said original image pixel in said neighborhood as an orientation reference;

(b) defining for each orientation reference at least a first reference set and a second reference set, each of said first and second reference sets containing a plurality of said original image pixels adjacent said orientation reference;

(c) generating for each orientation reference an orientation angle as a function of said predetermined intensities of said original image pixels in said reference sets; and, (d) defining eight quantization sectors characterized respectively by a plurality sector angles having the predetermined values 0.0, 22.5, 45.0, 67.5, 90.0, 112.5, 135.0, and 157.5 degrees, each of said quantization sectors having an approximate radial width of 22.5 degrees;

(e) selecting one of said quantization sectors in a manner dependent on said orientation angle; and, (f) assigning said sector angle of said selected quantization sector as said quantized orientation parameter of said orientation reference.

23. The method of adaptively enhancing the resolution of a video image as recited in claim 22 wherein said most highly recurrent quantized orientation parameter value is assigned as said dominant orientation parameter of said reference image pixel responsive to said positive test result.

24. The method of adaptively enhancing the resolution of a video image as recited in claim 23 wherein said degree parameter equals 4 for values of said dominant orientation parameter equal to 0.0 and 90.0 degrees and equals 7 for values of said dominant orientation parameter not equal to 0.0 or 90.0 degrees.

25. A method of adaptively enhancing by a predetermined enhancement factor the resolution of a video image formed by a plurality of original image pixels of predetermined intensities on a video display having a predetermined pixel array size comprising the steps of:

(a) establishing data storage means;

(b) defining a block and a neighborhood to contain a plurality of original image pixel at predetermined locations relative to the position of a reference image pixel, said neighborhood encompassing said block;

(c) defining a plurality of mutually exclusive orientation angle values;

(d) pre-storing in said data storage means a plurality of sets of parametric coefficients, said sets of parametric coefficients corresponding respectively to said orientation angle values;

(e) establishing a primary image field containing at least a portion of said original image pixels of said video image;

(f) iteratively designating each said original image pixel in said primary image field as said reference image pixel;

(g) designating for said reference image pixel, responsive to at least a portion of said predetermined original image pixel intensities in said neighborhood thereof, one of a plurality of predefined image classifications, said predefined image classifications including an oriented classification and a non-oriented classification;

(h) generating a dominant orientation parameter for said reference image pixel responsive to said oriented classification thereof, said dominant orientation parameter being equal to one of said orientation angle values;

(i) selecting relative to said reference image pixel at least one pixel insert position;

(j) selecting for said reference image pixel, responsive to said image classification designation, one of a plurality of predefined interpolation schemes for generating at least one supplemental image pixel, said predefined interpolation schemes including an adaptive interpolation scheme, said adaptive interpolation scheme including the steps of:

(1) retrieving from said storage means said set of parametric coefficients corresponding to said dominant orientation parameter;

(2) generating a set of weighting factors in a manner dependent on said set of parametric coefficients; and, (3) combining said set of weighting factors with said predetermined original image pixel intensities of said neighborhood to form said supplemental image pixel; and, (k) generating each said supplemental image pixel for said reference image pixel by use of said interpolation scheme selected.

26. A method of adaptively doubling the resolution of a video image formed by a plurality of original image pixels of predetermined intensities on a video display having a predetermined pixel array size comprising the steps of:

(a) establishing data storage means;

(b) defining a block and a neighborhood to contain a plurality of original image pixel at predetermined locations relative to the position of a reference image pixel, said neighborhood encompassing said block;

(c) defining a plurality of mutually exclusive orientation angle values;

(d) establishing a primary image field containing at least a portion of said original image pixels of said video image;

(e) selecting relative to said original image pixels in said primary image field at least one pixel insert position;

(f) pre-storing in said data storage means a plurality of sets of parametric coefficients, said sets of parametric coefficients corresponding respectively to said orientation angle values;

(g) iteratively designating each said original image pixel in said primary image field as said reference image pixel;

(h) designating for said reference image pixel, responsive to at least a portion of said predetermined original image pixel intensities in said neighborhood thereof, one of a plurality of predefined image classifications, said predefined image classifications including an oriented classification and a non-oriented classification;

(i) generating a dominant orientation parameter for said reference image pixel responsive to said oriented classification thereof, said dominant orientation parameter being equal to one of said orientation angle values;

(j) selecting for said reference image pixel, responsive to said image classification designation, one of a plurality of predefined interpolation schemes for generating at least three supplemental image pixels, said predefined interpolation schemes including an adaptive interpolation scheme, said adaptive interpolation scheme including the steps of:

(1) reading from said storage means said set of parametric coefficients corresponding to said dominant orientation parameter; and, (2) combining said set of parametric coefficients with said predetermined original image pixel intensities of said neighborhood to form said supplemental image pixel; and, (k) generating each said supplemental image pixel for said reference image pixel by use of said interpolation scheme selected.

27. A system for adaptive enhancement by a predetermined enhancement factor of the resolution of a video image characterized by a plurality of original image pixels having predetermined intensities comprising:

(a) a data storage module for storing video image information including said predetermined intensities of said original image pixels and a plurality of predetermined of parametric coefficient sets;

(b) a classification module coupled to said data storage module for reading at least a portion of said video image information and generating for selected ones of said original image pixels responsive to said video image information read one of a plurality of predefined image classifications, said predefined image classifications including an oriented classification and a non-oriented classification, said classification module generating a dominant orientation parameter for each said selected original image pixel having said oriented classification;

(c) a pixel insert positioning module coupled to said data storage module for generating in accordance with said enhancement factor at least one pixel insert position relative to each said selected original image pixel; and, (d) an adaptive interpolation module coupled to said classification module, said pixel insert positioning module, and said data storage module for generating a supplementary image pixel for each said pixel insert position each of said selected original image pixel having said oriented classification, said adaptive interpolation module reading said dominant orientation parameter and selecting one of said predetermined parametric coefficient sets responsive thereto, said adaptive interpolation module generating each said supplementary image pixel as a function of a plurality of adaptation parameters, said adaptation parameters including said pixel insert position, said dominant orientation parameter, and said predetermined set of parametric coefficients selected.

28. The system for adaptive enhancement of the resolution of a video image as recited in claim 27 further comprising a bilinear interpolation module coupled to said classification module, said pixel insert positioning module, and said data storage module for generating a supplementary image pixel for each said pixel insert position of said selected original image pixel having said non-oriented classification.

29. The system for adaptive enhancement of the resolution of a video image as recited in claim 27 wherein said data storage module includes at least one look-up table, said look-up table containing said predetermined sets of parametric coefficients, each said set of parametric coefficients being referenced in said look-up table by the value of said dominant orientation parameter corresponding thereto.

* * * * *